(12) United States Patent
Takiguchi

(10) Patent No.: US 7,531,939 B2
(45) Date of Patent: May 12, 2009

(54) COMMUNICATION DEVICE

(75) Inventor: Kiyoaki Takiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 11/652,490

(22) Filed: Jan. 12, 2007

(65) Prior Publication Data

US 2007/0205693 A1    Sep. 6, 2007

(30) Foreign Application Priority Data

Jan. 16, 2006    (JP) .............................. 2006-008006

(51) Int. Cl.
*H01L 41/08* (2006.01)
(52) U.S. Cl. ...................... 310/318; 310/311
(58) Field of Classification Search .................. 310/318, 310/322, 334, 338, 339, 311
See application file for complete search history.

(56) References Cited

U.S. PATENT DOCUMENTS

| | | | |
|---|---|---|---|
| 4,591,854 | A | 5/1986 | Robinson |
| 5,796,827 | A | 8/1998 | Coppersmith et al. |
| 5,811,897 | A | 9/1998 | Spaude et al. |
| 5,914,701 | A | 6/1999 | Gersheneld |
| 6,211,799 | B1 * | 4/2001 | Post et al. ...................... 341/33 |
| 6,223,018 | B1 | 4/2001 | Fukumoto et al. |
| 7,181,024 | B1 | 2/2007 | Oba et al. |

2006/0077616 A1    4/2006 Takiguchi

FOREIGN PATENT DOCUMENTS

| | | |
|---|---|---|
| JP | 57-160436 | 10/1982 |
| JP | 61-046638 | 3/1986 |
| JP | 07-170215 | 7/1995 |
| JP | 10-229357 | 8/1998 |
| JP | 2001-144662 | 5/2001 |
| JP | 2002-314920 | 10/2002 |
| JP | 2004-55500 | 2/2004 |
| JP | 2004-282733 | 10/2004 |
| JP | 2005-277995 | 10/2005 |
| WO | WO 2004/075751 A1 * | 9/2004 |
| WO | WO 2004/077705 A1 * | 9/2004 |
| WO | WO 2004/077704 A1 * | 10/2004 |

OTHER PUBLICATIONS

T.G. Zimmerman, "Personal Area Networks: Near-field intrabody communication", IBM Systems Journal, vol. 35, No. 3&4, pp. 609-617, 1996.

* cited by examiner

*Primary Examiner*—Thomas M Dougherty
(74) *Attorney, Agent, or Firm*—Finnegan, Henderson, Farabow, Garrett & Dunner, L.L.P.

(57) ABSTRACT

Herein disclosed is a communication device which includes: a piezoelectric element having a structure formed by laminating piezoelectric substances and electrodes; obtaining means for obtaining acoustic data superimposed on a quasi-electrostatic field formed on a living body from the electrode of the piezoelectric element; and driving means for driving the piezoelectric element as a speaker by outputting the acoustic data to the electrodes of the piezoelectric element.

18 Claims, 16 Drawing Sheets

FIG.12

| PULSE No | | S1 | S2 | S3 | S4 |
|---|---|---|---|---|---|
| CODE 1 | STOP | 1 | 1 | 0 | 0 |
| CODE 2 | PLAY | 1 | 0 | 1 | 0 |
| CODE 3 | FF | 1 | 0 | 1 | 1 |
| CODE 4 | FR | 1 | 0 | 0 | 1 |
| CODE 5 | PAUSE | 1 | 1 | 1 | 0 |
| CODE 6 | MUTE | 1 | 1 | 1 | 1 | ered in proximity to a mouth in a state of the elastic arm being hung
COMMUNICATION DEVICE

CROSS REFERENCES TO RELATED APPLICATIONS

The present invention contains subject matter related to Japanese Patent Application JP 2006-008006 filed in the Japanese Patent Office on Jan. 16, 2006, the entire contents of which being incorporated herein by reference.

BACKGROUND OF THE INVENTION

1. Field of the Invention

The present invention relates to a communication device, and is suitable for application in a case where an acoustic signal is communicated as an object of communication, for example.

2. Description of the Related Art

Of existing communication devices, there are short-range communication devices using Bluetooth (registered trademark), IrDA (Infrared Data Association) and the like as devices suitable for short-range communications, and various electronic apparatuses including the short-range communication devices have been proposed.

For example, an electronic device has been proposed which includes: a body part including a circuit board mounted with a short-range communication device and a speaker, the speaker having a sound emitting part to be held to an ear; an elastic arm for retaining the body part by being hung from an auricle, the elastic arm being formed in such a manner as to project from the body part in substantially an arc shape; and a microphone connected to the short-range communication device at an end part of the elastic arm, the end part extending in proximity to a mouth in a state of the elastic arm being hung from the auricle (see Japanese Patent Laid-Open No. 2005-277995, for example).

This electronic device transmits and receives an audio signal to and from a short-range communication device included in a portable telephone. It is thereby possible to make a call on the portable telephone in a hands-free state.

SUMMARY OF THE INVENTION

Such an electronic device has the short-range communication device and the speaker that are separate from each other. It is considered, however, that sharing even a part of these constitutions can correspondingly miniaturize the electronic device.

Also in cases of other electronic devices than the electronic device, it is considered that sharing a component between a component managing a communication function and a component managing a function other than the communication function can achieve a corresponding miniaturization.

The present invention has been made in view of the above, and it is desirable to propose a communication device that can be miniaturized.

According to an embodiment of the present invention, there is provided a communication device including: a piezoelectric element having a structure formed by laminating piezoelectric substances and electrodes; obtaining means for obtaining acoustic data superimposed on a quasi-electrostatic field formed on a living body from the electrode of the piezoelectric element; and driving means for driving the piezoelectric element as a speaker by outputting the acoustic data to the electrodes of the piezoelectric element.

Thus, in the communication device, the obtaining means obtains acoustic data with the electrode of the piezoelectric element as communication electrode, and the driving means outputs the acoustic data with the electrodes of the piezoelectric element as diaphragm of the speaker. Thus, the communication device can share the electrodes of the piezoelectric element, and use the piezoelectric element as a piezoelectric speaker and an antenna.

In addition, according to an embodiment of the present invention, there is provided a communication device including: a piezoelectric element having a structure formed by laminating piezoelectric substances and electrodes; energy storing means for storing a potential occurring at the electrodes due to a piezoelectric effect of the piezoelectric substances as electric energy; and communicating means for performing data communication with an object of communication via the electrode with a signal in a frequency band where strength of a quasi-electrostatic field is dominant as compared with a radiation field and an induction field at a predetermined distance as a carrier.

Thus, in the communication device, the energy storing means stores electric energy with the electrodes of the piezoelectric element as an energy generating source, and the communicating means performs data communication using the electric energy as driving energy and using the electrode of the piezoelectric element as F communication electrode. Thus, the communication device can share the electrodes of the piezoelectric element, and use the piezoelectric element as an electric energy generator and an antenna.

As described above, according to an embodiment of the present invention, the electrodes of the piezoelectric element are shared, and the piezoelectric element is used for two purposes. It is thereby possible to realize a miniaturized communication device as compared with a case of not sharing a component between a component managing a communication function and a component managing a function other than the communication function.

BRIEF DESCRIPTION OF THE DRAWINGS

FIG. 12 is a schematic diagram showing correspondences between stepping pulses and codes;

DETAILED DESCRIPTION OF THE PREFERRED EMBODIMENTS

Embodiments of the present invention will hereinafter be described in detail with reference to the drawings.

(1) Outline of Present Embodiments

The present embodiments use a method of communicating with a quasi-electrostatic field as a communication medium and with a living body disposed in the quasi-electrostatic field as a medium body. Description will first be made of a quasi-electrostatic field as a communication medium.

(1-1) Quasi-Electrostatic Field

Letting r be a distance from a minute dipole as an electric field generating source and P be a position at the distance r, a field strength E at the position P can be expressed as polar coordinates (r, θ, δ) from Maxwell equations, as in the following equations.

[Equation 1]

$$E_r = \frac{Ql\cos\theta}{2\pi\varepsilon r^3}(1+jkr)\exp(-jkr) \quad (1)$$

$$E_\theta = \frac{Ql\sin\theta}{4\pi\varepsilon r^3}(1+jkr+(jkr)^2)\exp(-jkr)$$

Incidentally, "Q" in Equation (1) denotes a charge [C]; "l" denotes a distance between charges ("l" is smaller than "r" from the definition of the minute dipole); "π" denotes a ratio of the circumference of a circle to a diameter thereof; "ε" denotes a dielectric constant of a space including the minute dipole; "j" denotes an imaginary unit; and "k" denotes a wave number.

When Equation (1) is expanded, the following equation is obtained.

[Equation 2]

$$E_r = \frac{Ql\cos\theta}{2\pi\varepsilon r^3}\cdot\exp(-jkr) + \frac{Ql\cos\theta}{2\pi\varepsilon r^3}\cdot jkr\cdot\exp(-jkr) \quad (2)$$

$$E_\theta = \frac{Ql\sin\theta}{4\pi\varepsilon r^3}\cdot\exp(-jkr) +$$
$$\frac{Ql\sin\theta}{4\pi\varepsilon r^3}\cdot jkr\cdot\exp(-jkr) + \frac{Ql\sin\theta}{4\pi\varepsilon r^3}\cdot(jkr)^3\cdot\exp(-jkr)$$

As is understood from Equation (2), electric fields $E_r$ and $E_\theta$ are generated as composite electric fields of a radiation field (third term of $E_\theta$) linearly inversely proportional to the distance from the electric field generating source, induction fields (second terms of $E_r$ and $E_\theta$) inversely proportional to the square of the distance from the electric field generating source, and quasi-electrostatic fields (first terms of $E_r$ and $E_\theta$) inversely proportional to the cube of the distance from the electric field generating source.

Figure 1:
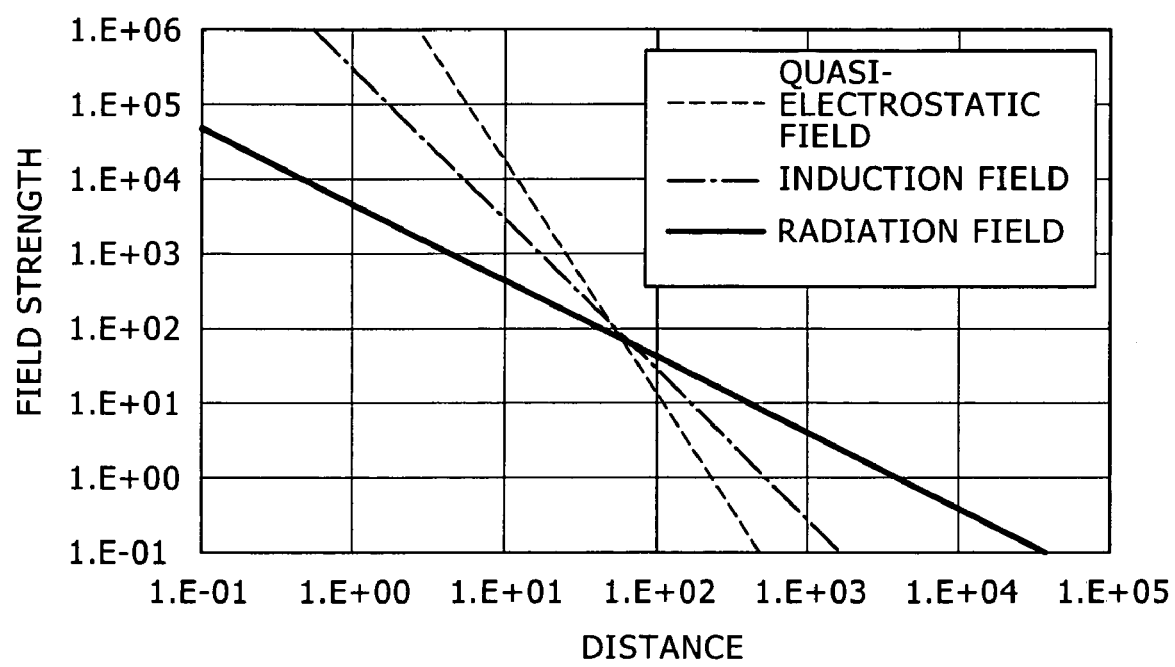
FIG. 1 is a schematic diagram showing relative strength change of each field according to distance (1 [MHz])

Relations between the relative strengths of the radiation field, the induction field, and the quasi-electrostatic field and distance are represented in graph form in FIG. 1. FIG. 1 represents the relations between the relative strengths of the respective fields and distance at 1 [MHz] by exponents.

As is clear from FIG. 1, there exists a distance (hereinafter referred to as a strength boundary point) at which the relative strengths of the radiation field, the induction field, and the quasi-electrostatic field are equal to each other. In this case, in a space more distant than the strength boundary point, the radiation field is dominant (a state where the strength of the radiation field is higher than those of the induction field and the quasi-electrostatic field), while in a space nearer than the strength boundary point, the quasi-electrostatic field is dominant (a state where the strength of the quasi-electrostatic field is higher than those of the radiation field and the induction field).

At the strength boundary point, the components of the fields corresponding to the terms of the electric field $E_\theta$ in Equation (2), that is, the following equations coincide with each other (that is, $E_{\theta 1}=E_{\theta 2}=E_{\theta 3}$).

[Equation 3]

$$E_{01} = \frac{Ql\sin\theta}{4\pi\varepsilon r^3}\cdot\exp(-jkr) \quad (3)$$

$$E_{02} = \frac{Ql\sin\theta}{4\pi\varepsilon r^3}\cdot jkr\cdot\exp(-jkr)$$

$$E_{03} = \frac{Ql\sin\theta}{4\pi\varepsilon r^3}\cdot(jkr)^2\cdot\exp(-jkr)$$

Thus, the strength boundary point can be expressed in a case where the following equation is satisfied.

[Equation 4]

$$1=jkr=(jkr)^2 \quad (4)$$

That is, the strength boundary point can be expressed by the following equation.

[Equation 5] (5)

$$r = \frac{1}{k}$$

Then, letting v [m/s] be the propagation velocity of the electric field in a medium and f [Hz] be the frequency, the wave number k in Equation (5) can be expressed by the following equation.

[Equation 6]

$$k = \frac{2\pi f}{v} \quad (6)$$

Letting c [m/s] be the velocity of light (c=3×10⁸), the propagation velocity v of the electric field can be expressed by the following equation using the velocity of light c and the relative dielectric constant ε of the dielectric constant medium of the space including the minute dipole.

[Equation 7]

$$v = \frac{c}{\sqrt{\varepsilon}} \quad (7)$$

Thus, the strength boundary point can be expressed by the following equation obtained by substituting Equation (6) and Equation (7) into Equation (5) and then arranging the resulting equation.

[Equation 8]

$$r = \frac{c}{2\pi f \cdot \sqrt{\varepsilon}} \quad (8)$$

As is understood from Equation (8), when the space of the quasi-electrostatic field whose strength is higher than those of the radiation field and the induction field (which space will hereinafter be referred to as a quasi-electrostatic field dominance space) is to be increased, the frequency is closely related, and the lower the frequency, the larger the quasi-electrostatic field dominance space (that is, the distance to the strength boundary point shown in FIG. 1 becomes longer as the frequency becomes lower (that is, the strength boundary point is shifted to the right)). On the other hand, the higher the frequency, the smaller the quasi-electrostatic field dominance space.(that is, the distance to the strength boundary point shown in FIG. 1 becomes shorter as the frequency becomes higher (that is, the strength boundary point is shifted to the left)).

For example, when 10 [MHz] is selected, the space where the quasi-electrostatic field is dominant is present at a distance of 4.8 [m] or less from the electric field source. Relations between the relative strengths of the radiation field, the induction field, and the quasi-electrostatic field and the distance are represented in graph form in FIG. 2 when 10 [MHz] is selected.

Figure 2:
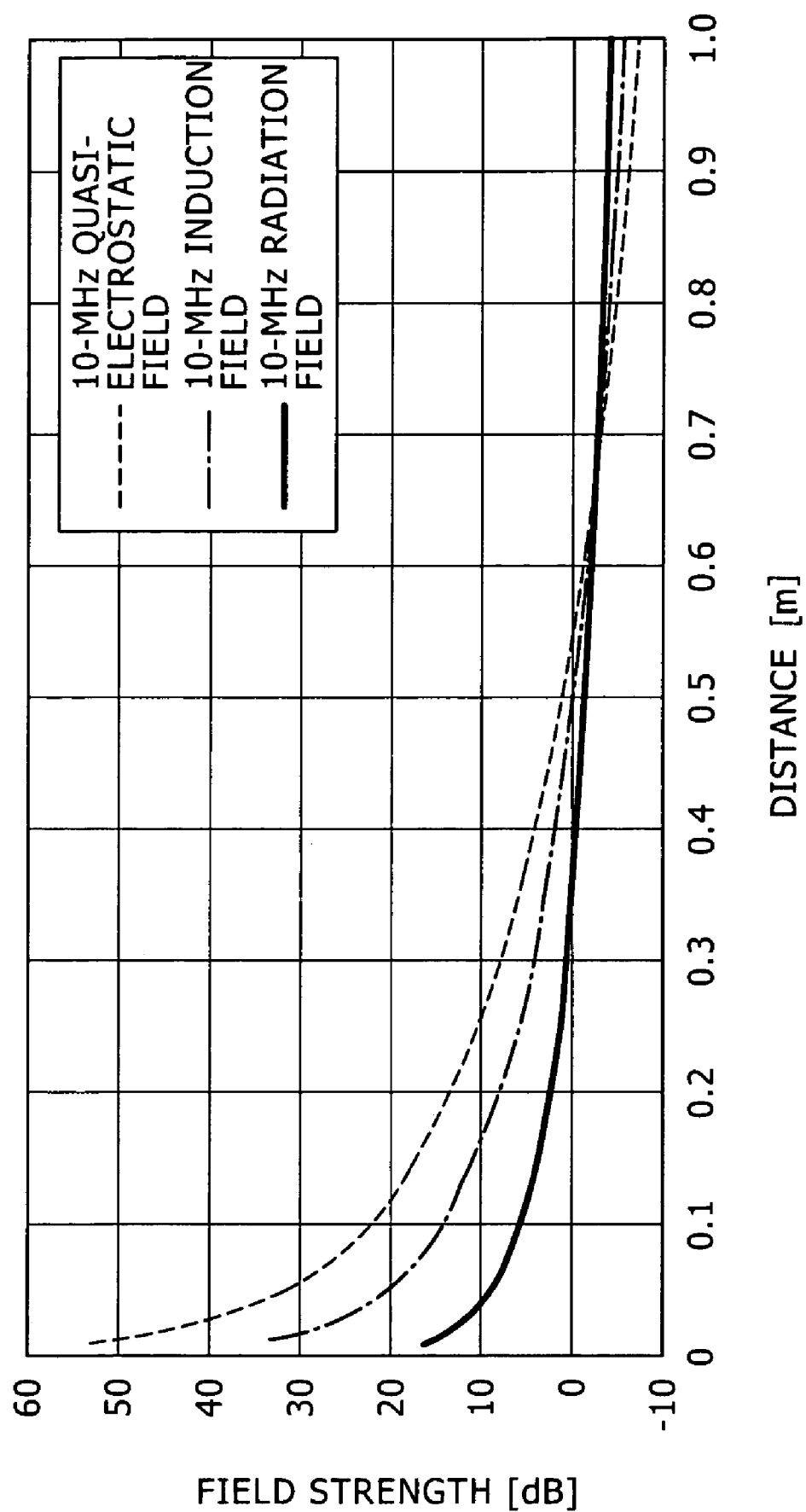
FIG. 2 is a schematic diagram showing relative strength change of each field according to distance (10 [MHz])

As is clear from FIG. 2, the strength of the quasi-electrostatic field at a position at a distance of 0.01 [m] from the electric field generating source is higher than that of the induction field by about 18.2 [dB]. It can therefore be considered that the quasi-electrostatic field in this case is not affected by the induction field and the radiation field.

Thus, when the relation of Equation (8) is satisfied, of the fields generated from the electric field generating source, the quasi-electrostatic field is dominant in strength over the radiation field and the induction field, and therefore the quasi-electrostatic field can be utilized as a communication medium.

(1-2) Quasi-Electrostatic Field and Living Body

Description will next be made of relation between the quasi-electrostatic field and the living body. When a living body is made to generate a radiation field or an induction field, it is necessary to make an electric current flow through the living body. Since a living body has a very high impedance, however, making an electric current flow through the living body efficiently is physically difficult, and is not preferable from a physiological viewpoint. However, static electricity is totally different.

Specifically, a living body is charged very well, as is suggested from an empirical fact that we physically experience a discharge in daily life when we are electrostatically charged and bring a hand close to a door knob, for example. In addition, it is known that a quasi-electrostatic field is generated by charging of the surface of a living body according to a movement. Therefore, in order to make a living body generate a quasi-electrostatic field, it is not necessary to make an electric current flow through the living body, and it suffices to charge the living body.

That is, a living body is charged by movement of a very little charge. When charging occurs at a certain point on the surface of a living body, it instantly propagates around the surface of the living body from the point due to dielectric polarization in the living body. As a result, an equipotential surface of a quasi-electrostatic field is formed substantially isotropically from the surface of the living body. Hence, a living body disposed in an area where the above-described Equation (8) is satisfied and where the quasi-electrostatic field is dominant efficiently functions as a medium body because the radiation field and the induction field produce little effect. This has already been confirmed by results of experiments by the present applicant and prototypes.

Thus, the present embodiments use the properties of the quasi-electrostatic field and the properties of the living body, make the living body disposed within a range where the quasi-electrostatic field is dominant act as a medium body by charging the living body, and use the quasi-electrostatic field formed in the vicinity of the living body as a communication medium. The present embodiments will be described below.

(2) First Embodiment (2-1) General Configuration of Communication System

Figure 3:
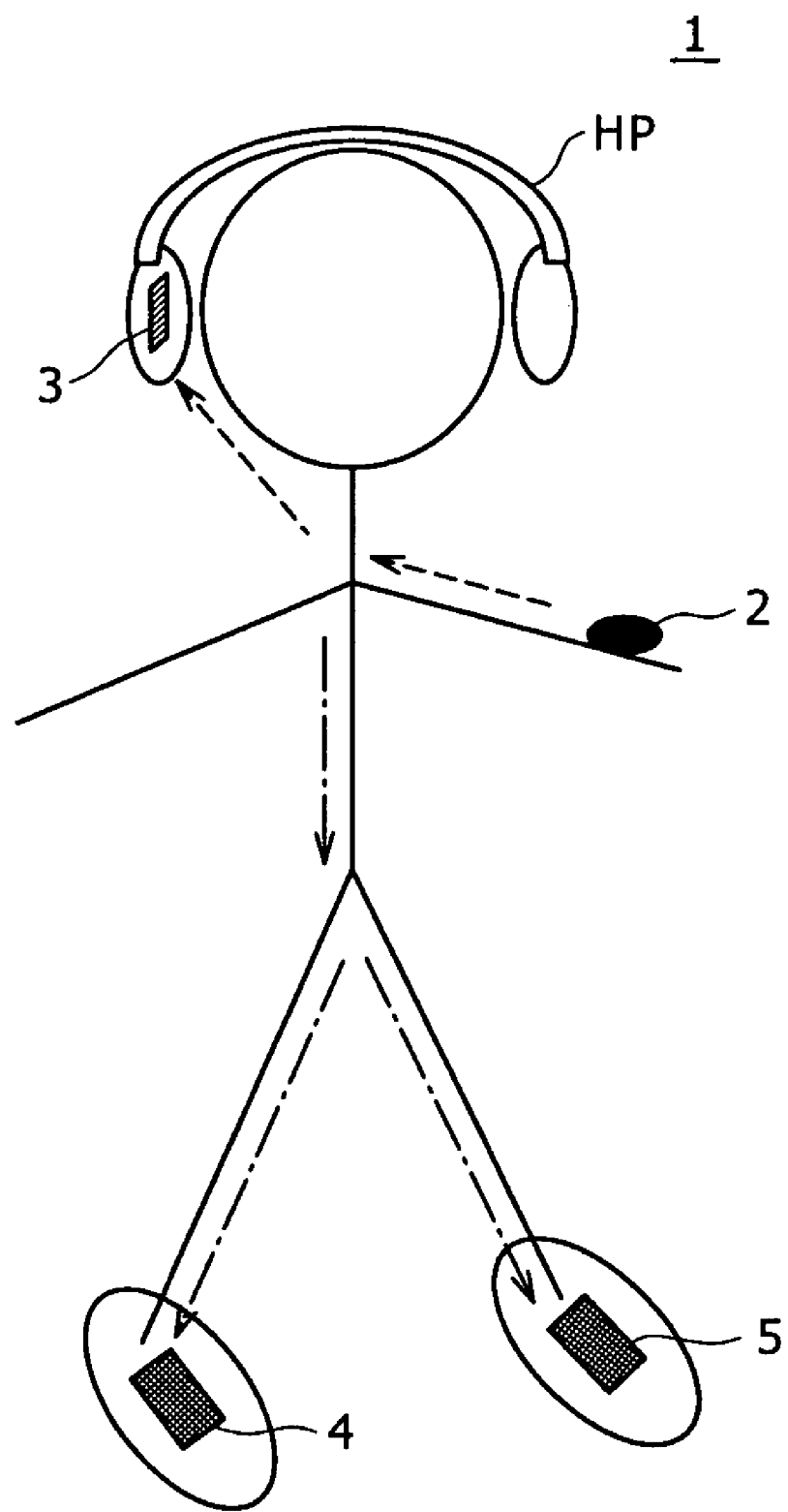
FIG. 3 is a schematic diagram showing a general configuration of a communication system according to a first embodiment.

FIG. 3 shows a general configuration of a communication system 1 according to a first embodiment. The communication system 1 includes: a transmitting device (hereinafter referred to as a transmitter) 2 included in a portable type device such for example as a portable telephone, a wrist watch, or a "HANDYCAM (Registered Trademark of Sony Corporation)"; a first receiving device (hereinafter referred to as a headphone receiver) 3 included in headphones HP; and a second receiving device and a third receiving device (hereinafter referred to as shoe sole receivers) 4 and 5 provided to the respective shoe soles of a pair of shoes worn on the feet of a living body.

Figure 4:
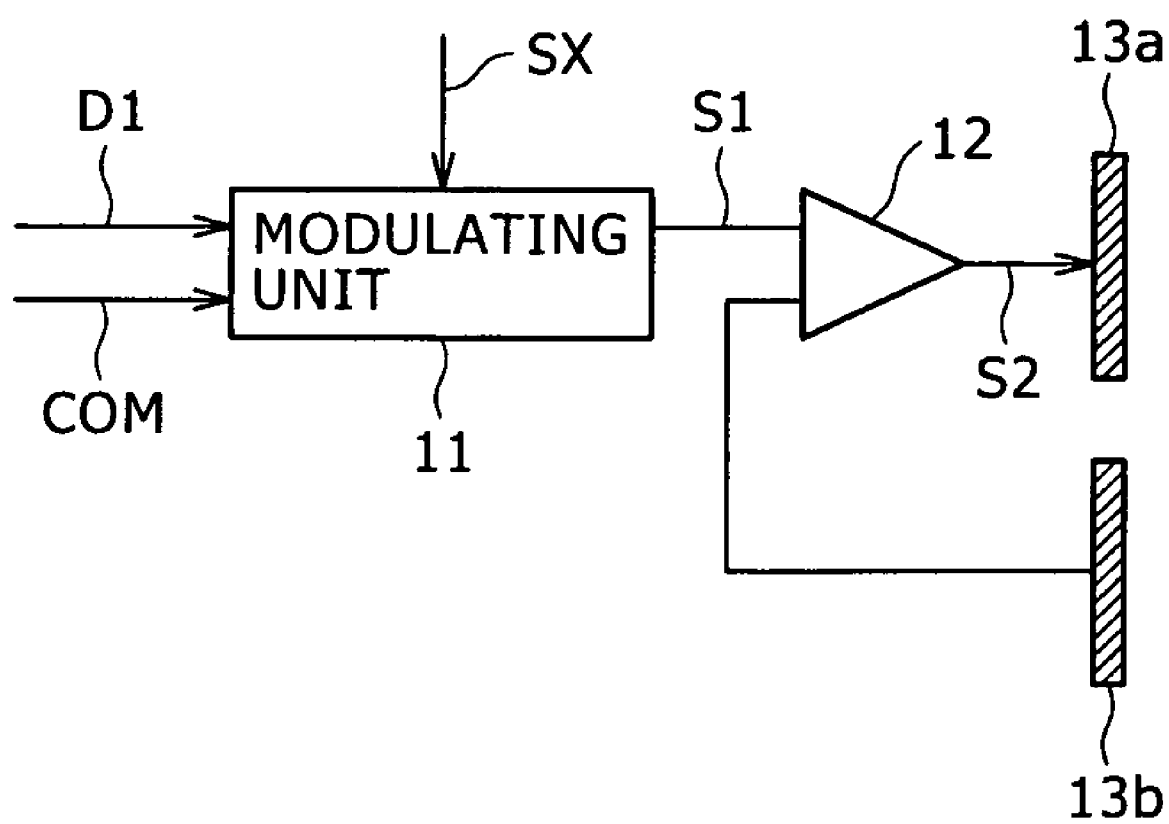
FIG. 4 is a block diagram showing a configuration of a transmitter.

As shown in FIG. 4, the transmitter 2 includes a modulating unit 11, a signal amplifying unit 12, and a transmitting electrode 13. The modulating unit 11 is supplied with acoustic data D1 from an acoustic source in the portable type device.

The modulating unit 11 modulates a carrier SX on the basis of the acoustic data D1, and transmits a resulting modulated signal S1 to the signal amplifying unit 12. The signal amplifying unit 12 amplifies the modulated signal S1 to a predetermined signal level according to a difference between the modulated signal S1 and a result of detection at a transmitting electrode 13b, and outputs the amplified modulated signal S2 to a transmitting electrode 13a. The transmitting electrode 13a vibrates according to the frequency of the carrier SX, so that a composite electric field of a radiation field, an induction field, and a quasi-electrostatic field is transmitted from the transmitting electrode 13a.

In the present embodiment, for the carrier SX, 10 [MHz], for example, is selected as a low frequency satisfying Equation (8) in consideration of a distance between the transmitter 2 and the headphone receiver 3, a distance between the transmitter 2 and the shoe sole receiver 4, a distance between the transmitter 2 and the shoe sole receiver 5, the relative dielectric constants of air and the living body, and the like.

Thus, the quasi-electrostatic field of higher strength than the strengths of the radiation field and the induction field is applied to the living body disposed in the vicinity of the transmitting electrode 13. A dielectric polarization occurs in the living body to which the quasi-electrostatic field is applied, the quasi-electrostatic field propagates around the surface of the living body, and an equipotential surface is formed.

Figure 5:
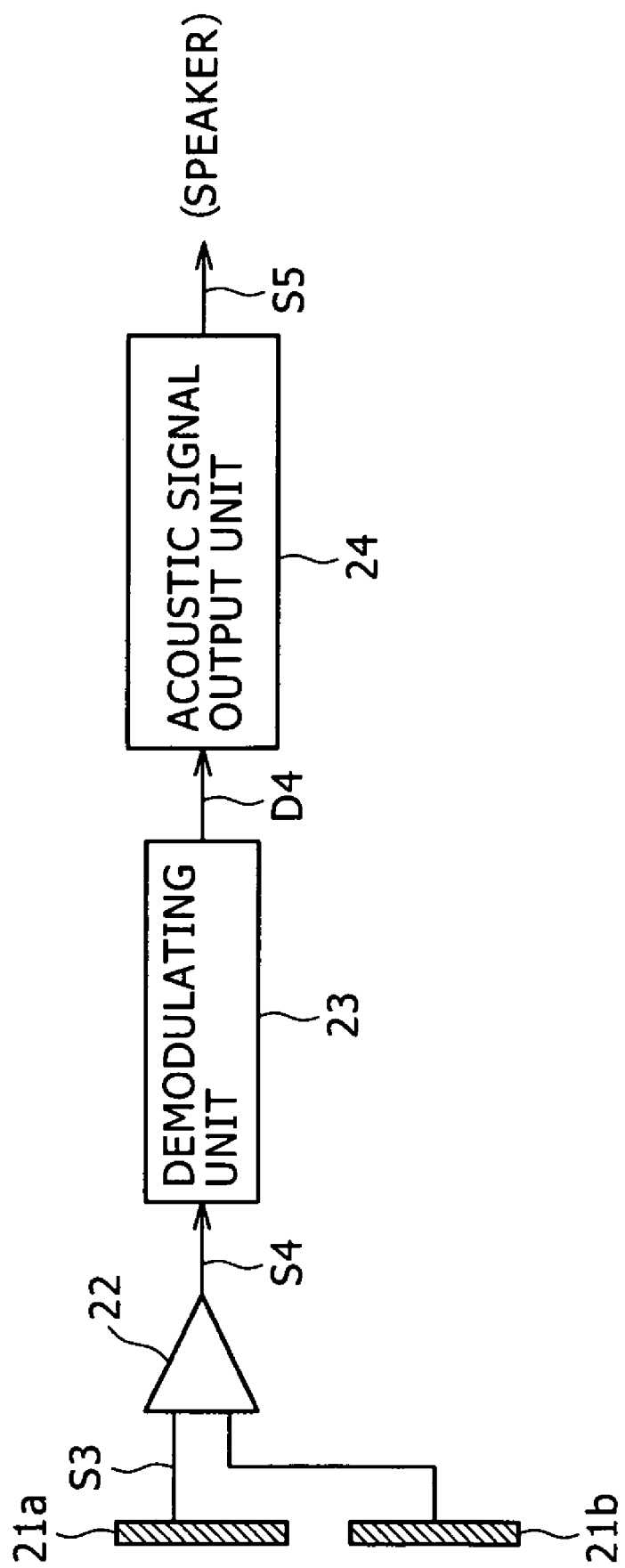
FIG. 5 is a block diagram showing a configuration of a headphone receiver.

As shown in FIG. 5, the headphone receiver 3 includes a receiving electrode 21, a signal amplifying unit 22, a demodulating unit 23, and an acoustic signal output unit 24. In this headphone receiver 3, a potential difference occurs between two receiving electrodes 21a and 21b according to a potential change of the quasi-electrostatic field formed around the surface of the living body. This potential difference is detected as a received signal S3, and then input to the signal amplifying unit 22.

The signal amplifying unit 22 amplifies the received signal S3 to a predetermined signal level, and transmits the amplified received signal S4 to the demodulating unit 23. The demodulating unit 23 demodulates the received signal S4, and transmits acoustic data D4 resulting from the demodulation to the acoustic signal output unit 24.

The acoustic signal output unit 24 subjects the acoustic data D4 to a D/A (Digital/Analog) conversion process, then amplifies the acoustic data D4 to a predetermined signal level, and outputs a resulting acoustic signal S5 to speakers disposed in ear pads of the headphone device HP (FIG. 3).

The shoe sole receivers 4 and 5 store electric energy generated by a bimorph (not shown) by movement of the living body which movement is principally the walking of the living body. In addition, the shoe sole receivers 4 and 5 detect, as a received signal, potential changes of the quasi-electrostatic field formed around the surface of the living body from an electrode of the bimorph, using the stored electric energy as driving energy, and make the bimorph function as a piezoelectric speaker on the basis of the received signal.

Thus the communication system 1 transmits and receives the acoustic data D1 between the transmitter 2 and the headphone receiver 3 and between the transmitter 2 and the shoe sole receivers 4 and 5, using the quasi-electrostatic field as a communication medium for the acoustic data D1, and using the living body disposed in the quasi-electrostatic field as a medium body, so that the user can be made to feel sound based on the acoustic data D1 through auditory sensation and simultaneously feel the sound through bodily sensation.

Incidentally, broken lines shown in FIG. 3 schematically represent a flow of the acoustic data D1 between the transmitter 2 and the headphone receiver 3. Alternate long and short dash lines shown in FIG. 3 schematically represent a flow of the acoustic data D1 between the transmitter 2 and the shoe sole receivers 4 and 5.

Incidentally, in the communication system 1 according to the present embodiment, the transmitter 2, the headphone receiver 3, and the shoe sole receivers 4 and 5 are each designed such that the radiation field and the induction field are at or below a noise floor level and exceed a level detectable on the receiving side at a position where use is assumed.

Specifically, parallel plate electrodes are employed as the transmitting electrode 13 of the transmitter 2, the receiving electrode 21 of the headphone receiver 3, and the electrodes (30c and 30d in FIG. 6 to be described later) of the bimorph in both the shoe sole receivers 4 and 5, and with the electrode shape, the electrode area, and the inter-electrode distance of the parallel plate electrodes as parameters, the parallel plate electrodes are designed so as to satisfy a relation such that when a signal of a certain frequency is given, an induction field component of an electric field at a position near a transmitting side is smaller than the noise floor and larger than voltage noise in the signal amplifying unit of a receiving side detecting the electric field. For more detailed information, see Japanese Patent Laid-Open No. 2004-55500, for example.

Thereby the communication system 1 avoids a situation in which a signal component to reach a device on a receiving side via a living body and a signal component reaching the device on the receiving side via an electric field formed in the air have physically opposite phases and thus cancel each other out. Therefore a signal component to be received can be surely received. As a result, the communication system 1 can optimize energy necessary for communication, and achieve stabilization during the communication.

(2-2) Configuration of Shoe Sole Receiver

The configuration of the shoe sole receivers 4 and 5 will next be described. However, since the shoe sole receivers 4 and 5 have the same configuration, only the configuration of the shoe sole receiver 4 will be described below in detail.

Figure 6:
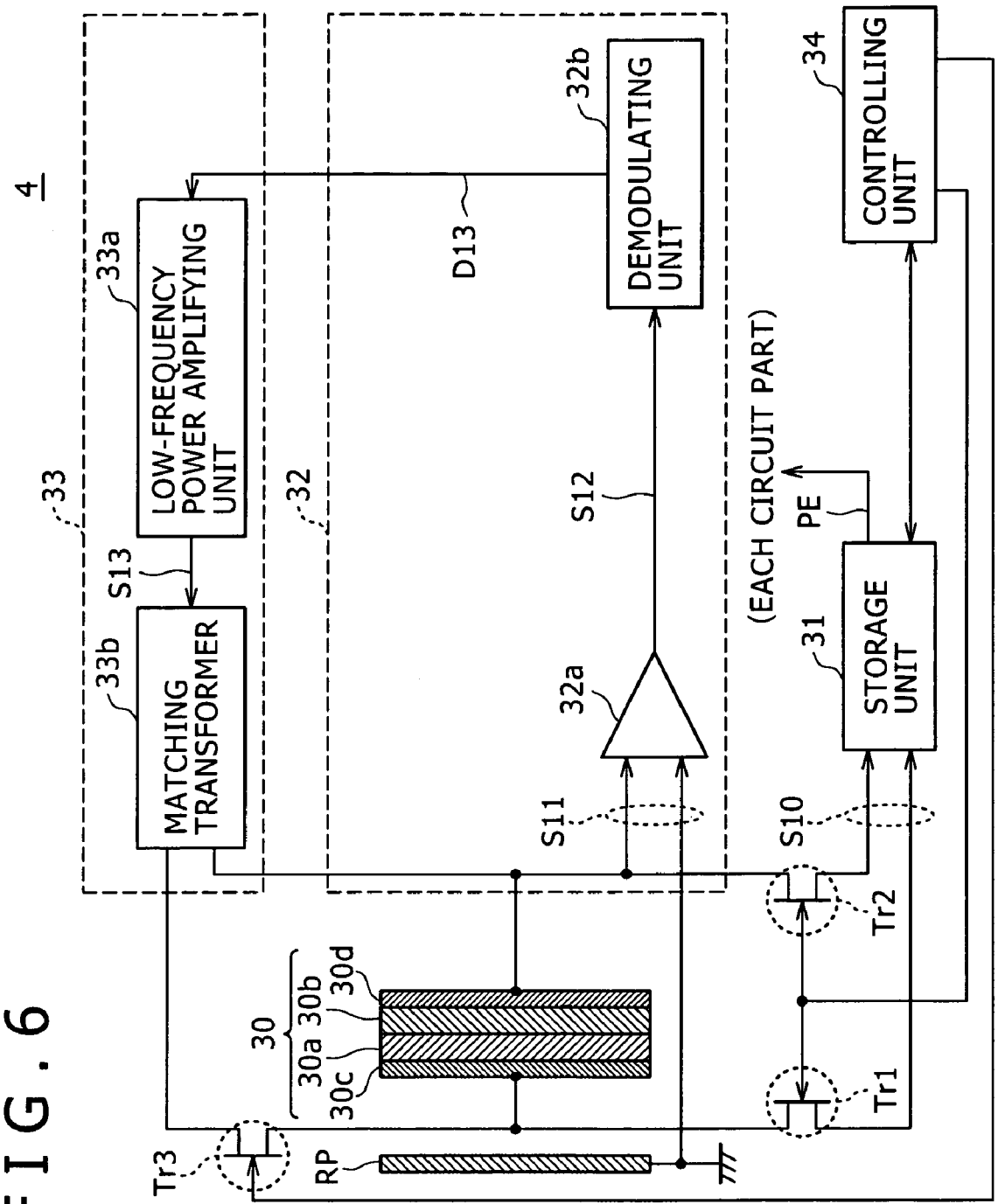
FIG. 6 is a block diagram showing a configuration of a shoe sole receiver.

As shown in FIG. 6, the shoe sole receiver 4 includes a bimorph 30, a storage unit 31, a receiving unit 32, a speaker driving unit 33, and a controlling unit 34. The bimorph 30 has a structure formed by laminating thin piezoelectric substances 30a and 30b polarized in a direction of thickness, and laminating a pair of parallel plate electrodes 30c and 30d to surfaces of the piezoelectric substances 30a and 30b.

The parallel plate electrodes 30c and 30d are connected to the storage unit 31 and the speaker driving unit 33 via corresponding transmission lines. Switching transistors Tr1 and Tr2 are provided to the transmission lines between the parallel plate electrodes 30c and 30d and the storage unit 31. A switching transistor Tr3 is provided to the transmission line between one parallel plate electrode 30c and the speaker driving unit 33.

The shoe sole receiver 4 operates in a storage mode when the switching transistors Tr1 and Tr2 are on and the switching transistor Tr3 is off. On the other hand, the shoe sole receiver 4 operates in an acoustic output mode when the switching transistors Tr1 and Tr2 are off and the switching transistor Tr3 is on.

(2-2-1) Storage Mode

The contents of processing in the shoe sole receiver 4 will be described below in separate cases of the charging mode and the acoustic output mode. When the bimorph 30 is bent in a direction of thickness with a neutral surface of the piezoelectric substances 30a and 30b as a reference by a movement of the living body, which movement is principally the walking of the living body, one of the piezoelectric substances 30a and 30b is stretched in a direction of the plane, and simultaneously the other is compressed. As a result, an alternating potential change occurs in the parallel plate electrodes 30c and 30d due to a piezoelectric effect.

In the storage mode, the alternating potential change occurring in the parallel plate electrodes 30c and 30d due to a piezoelectric effect is supplied as an alternating-current signal S10 to the storage unit 31. The storage unit 31 rectifies the alternating-current signal S10, and outputs a direct-current signal obtained as a result of the rectification to a capacitor (not shown). Electric energy stored in the capacitor supplied with the direct-current signal is supplied as driving energy PE for driving the receiving unit 32, the speaker driving unit 33, and the controlling unit 34.

Thus, the shoe sole receiver 4 can convert a current generated in the bimorph by the movement of the living body, which movement is mainly leg movement such as the walking, stepping or the like of the living body, into electric energy, and store the converted electric energy as driving energy PE.

(2-2-2) Acoustic Output Mode

In the acoustic output mode, on the other hand, a quasi-electrostatic field formed around the surface of the living body by the transmitter 2 is detected as a received signal S11 by one electrode 30d in the bimorph 30 and a receiving electrode RP. The received signal S11 is supplied to a signal amplifying unit 32a in the receiving unit 32.

The signal amplifying unit 32a amplifies the received signal S11 to a predetermined signal level, and transmits the amplified received signal S12 to a demodulating unit 32b. The demodulating unit 32b demodulates the received signal S12, and thereby generates acoustic data D13 corresponding to the acoustic data D1 (FIG. 4) supplied from the transmitter 2 (FIG. 3) with the quasi-electrostatic field as a communication medium. The demodulating unit 32b transmits the acoustic data D13 to the speaker driving unit 33.

Incidentally, the received signal S11 includes a signal component corresponding to potential changes in an ultralow frequency band (1 [MHz] and lower) superimposed on the quasi-electrostatic field according to the movement of the living body. However, this signal component differs greatly from an acoustic component having a carrier frequency (10 [MHz]), and therefore does not affect demodulation or the like of the acoustic component. Therefore, in the present embodiment, only the originally intended acoustic component can be obtained without restraining various movements of the living body in any manner.

A low-frequency power amplifying unit 33a in the speaker driving unit 33 amplifies a low-frequency component of the acoustic data D13 to a predetermined level, and transmits a resulting acoustic signal (hereinafter referred to as a low-frequency acoustic signal) S13 to a matching transformer 33b.

The matching transformer 33b raises the voltage of the low-frequency acoustic signal S13, and outputs the result to the parallel plate electrodes 30c and 30d of the bimorph 30. As a result, the parallel plate electrodes 30c and 30d vibrate according to the low-frequency acoustic signal S13, and the vibrating wave is applied to the sole of the living body.

The sole of the living body is a part where various nerves concentrate, and is a part where nerves highly sensitive to a low-frequency band, in particular, concentrate. Therefore low-frequency sound can be made to be felt through bodily sensation with higher sensitivity as compared with a case where the vibrating wave corresponding to the low-frequency acoustic signal S13 is applied to another part of the living body.

Thus the shoe sole receiver 4 can make the bimorph function as a piezoelectric speaker (vibrating speaker) so that low-frequency sound can be made to be felt through bodily sensation.

(2-2-3) Mode Changing Process

A mode changing process of the shoe sole receiver 4 will next be described. The controlling unit 34 in the shoe sole receiver 4 has a computer configuration including a CPU (Central Processing Unit) for controlling the whole of the shoe sole receiver 4, a ROM (Read Only Memory) storing various programs, and a RAM (Random Access Memory) as a work memory for the CPU.

The controlling unit 34 monitors the level of electric energy stored in the capacitor (not shown) in the storage unit 31 on the basis of a program stored in the ROM, and changes and controls the on/off states of the switching transistors Tr1 and Tr2 and the switching transistor Tr3 according to the level.

Specifically, when the level of the electric energy stored in the capacitor (not shown) in the storage unit 31 exceeds an upper limit threshold value, the controlling unit 34 performs control so as to turn off the switching transistors Tr1 and Tr2 and turn on the switching transistor Tr3, so that the shoe sole receiver 4 is operated in the acoustic output mode as operation mode.

In this case, the shoe sole receiver 4 electrically disconnects the storage unit 31 from the bimorph 30, and can thus surely prevent a backflow of the electric energy stored in the capacitor (not shown) in the storage unit 31 to the bimorph 30. In addition, the shoe sole receiver 4 can electrostatically disconnect the bimorph 30 as electrodes.

On the other hand, when the energy level falls below a lower limit threshold value, the controlling unit 34 performs control so as to turn on the switching transistors Tr1 and Tr2 and turn off the switching transistor Tr3, so that the shoe sole receiver 4 is operated in the storage mode as operation mode.

In this case, the shoe sole receiver 4 electrically disconnects the speaker driving unit 33 from the bimorph 30, so that a loss in power generation at the speaker driving unit 33 can be suppressed.

Thus the shoe sole receiver 4 can change the operation mode to the storage mode or the acoustic output mode.

(2-3) Operation and Effect of Present Embodiment

With the above configuration, as shown in FIG. 6, the shoe sole receiver 4 (or 5) in the communication system 1 obtains the acoustic data D13 corresponding to the acoustic data D1 superimposed on the quasi-electrostatic field formed on the living body on the basis of the received signal S11 obtained from the receiving electrode RP and the parallel plate electrode 30d of the bimorph 30, raises the voltage of the low-frequency component of the acoustic data D13, and then outputs the result to the parallel plate electrodes 30c and 30d of the bimorph 30.

Thus, the shoe sole receiver 4 (or 5) can use the parallel plate electrodes 30c and 30d of the bimorph 30 as both communication electrodes (receiving electrodes) and a diaphragm of the speaker. As a result, the shoe sole receiver 4 (or 5) can use the bimorph 30 as a piezoelectric speaker and an antenna.

In addition, the shoe sole receiver 4 (or 5) stores an alternating potential change occurring in the parallel plate electrodes 30c and 30d due to a piezoelectric effect in the capacitor as electric energy, and uses the electric energy as driving energy.

Thus, the shoe sole receiver 4 (or 5) can use the parallel plate electrodes 30c and 30d of the bimorph 30 not only as communication electrodes (receiving electrodes) and the diaphragm of the speaker but also as the electrodes of a driving energy generating source. As a result, the shoe sole receiver 4 (or 5) can use the bimorph 30 as a piezoelectric speaker, an antenna, and an energy generator.

As a result, the shoe sole receiver 4 (or 5) makes it possible to use a highly realistic body sonic effect while making a movement such as walking or the like in a state where use of a cable between the headphone receiver 3 and the transmitter 2 is avoided (wireless state). It is also possible to omit a battery for storing electricity according to the movement, so that the shoe sole receiver 4 (or 5) is user-friendly.

According to the above constitution, the parallel plate electrodes 30c and 30d of the bimorph 30 can be used as communication electrodes (receiving electrodes), the diaphragm of the speaker, and the electrodes of the driving energy generating source. Thus, the bimorph 30 can be used as a piezoelectric speaker, an antenna, and an energy generator. It is thereby possible to realize a miniaturized communication device.

(3) Second Embodiment

(3-1) General Configuration of Communication System

Figure 7:
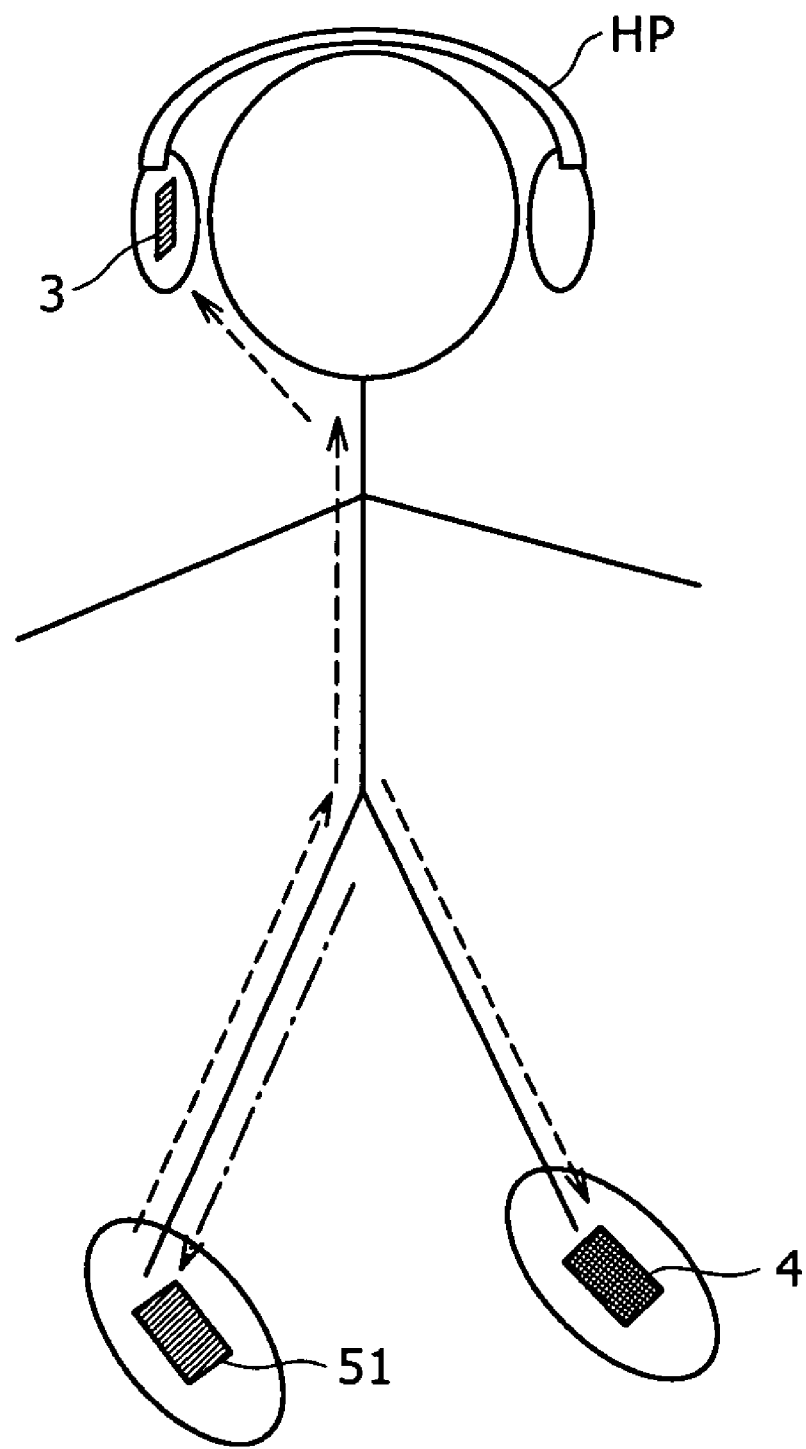
FIG. 7 is a schematic diagram showing a general configuration of a communication system according to a second embodiment.

FIG. 7, in which parts corresponding to those of FIG. 3 are identified by the same reference numerals, shows a general configuration of a communication system 50 according to a second embodiment. The communication system 50 includes: a transmitting device (hereinafter referred to as a shoe sole transmitter) 51 provided to the sole of one of a pair of shoes worn on the feet of a living body; a headphone receiver 3 included in headphones HP; and a shoe sole receiver 4 provided to the sole of the other of the pair of shoes.

The shoe sole transmitter 51 includes a bimorph (not shown). The shoe sole transmitter 51 converts a current generated in the bimorph by the movement of the living body, which movement is mainly the walking of the living body, into electric energy, and stores the converted electric energy.

The shoe sole transmitter 51 also includes a memory having acoustic data recorded therein as an acoustic source. The shoe sole transmitter 51 outputs the acoustic data recorded in the memory using the stored electric energy as driving energy, and thereby makes the bimorph function as a piezoelectric speaker.

At this time, the shoe sole transmitter 51 modulates a predetermined carrier on the basis of the acoustic data recorded in the memory. As in the case described above in the first embodiment, for this carrier, 10 [MHz], for example, is selected as a low frequency satisfying Equation (8) in consideration of a distance between the shoe sole transmitter 51 and the headphone receiver 3, a distance between the shoe sole transmitter 51 and the shoe sole receiver 4, the relative dielectric constants of air and the living body, and the like.

Thus, by amplifying a modulated signal obtained as a result of modulating the carrier to a predetermined signal level and then outputting the amplified modulated signal to the electrode of the bimorph, the shoe sole transmitter 51 can apply a quasi-electrostatic field of higher strength than the strengths of a radiation field and an induction field to the living body disposed in the vicinity of the electrode. A dielectric polarization occurs in the living body to which the quasi-electrostatic field is applied, the quasi-electrostatic field propagates around the surface of the living body, and an equipotential surface is formed.

The headphone receiver 3 generates an acoustic signal as described above in the first embodiment on the basis of a potential change of the quasi-electrostatic field formed around the surface of the living body, and outputs the acoustic signal to speakers disposed in ear pads of the headphone device HP (FIG. 3).

As described above in the first embodiment, the shoe sole receiver 4 receives the potential change of the quasi-electrostatic field formed around the surface of the living body from the electrode of a bimorph (not shown), using electric energy converted by the bimorph as driving energy. The shoe sole receiver 4 makes the bimorph function as a piezoelectric speaker on the basis of a result of the reception.

Thus the communication system 50 transmits and receives the acoustic data between the shoe sole transmitter 51 and the headphone receiver 3 and between the shoe sole transmitter 51 and the shoe sole receiver 4, using the quasi-electrostatic field as a communication medium for the acoustic data, and using the living body disposed in the quasi-electrostatic field as a medium body, so that sound based on the acoustic data recorded in the memory of the shoe sole transmitter 51 can be made to be felt through auditory sensation and simultaneously felt through bodily sensation.

Incidentally, broken lines shown in FIG. 7 schematically represent a flow of the acoustic data between the shoe sole transmitter 51 and the headphone receiver 3 and between the shoe sole transmitter 51 and the shoe sole receiver 4.

In addition to such a configuration, the shoe sole transmitter 51 in the communication system 50 detects the number of movements from raising of a foot to setting down of the foot (the movements will hereinafter be referred to as stepping unit movements) and intervals between the movements (hereinafter referred to as stepping rhythm) from potential changes in a movement of raising and setting down feet at the same position (this movement will hereinafter be referred to as a stepping movement) among the potential changes of the quasi-electrostatic field formed around the surface of the living body. The shoe sole transmitter 51 performs reproduction processing on the acoustic data recorded in the memory according to a result of the detection.

Thus, in the communication system 50, the quasi-electrostatic field formed around the surface of the living body according to the movement of the living body is used as a command, whereby the communication medium for the acoustic data can also be used as a communication medium for the command. In addition, the stepping movement itself of the living body can substitute for an operating unit.

Incidentally, alternate long and short dash lines shown in FIG. 7 schematically represent a flow of the command between the living body and the shoe sole transmitter 51.

Incidentally, as in the communication system 1 according to the first embodiment, in the communication system 50, parallel plate electrodes are employed as the electrodes of the bimorph in the shoe sole transmitter 51, the receiving electrodes of the headphone receiver 3, and the electrodes of the bimorph (not shown) in the shoe sole receiver 4, and with the electrode shape, the electrode area, and the inter-electrode distance of the parallel plate electrodes as parameters, the parallel plate electrodes are designed so as to satisfy a relation such that when a signal of a certain frequency is given, an induction field component of an electric field at a position near a transmitting side is smaller than the noise floor and larger than voltage noise in the signal amplifying unit of a receiving side detecting the electric field.

Thus, in the communication system 50, as described above in the first embodiment, a signal component to be received can be surely received. As a result, energy necessary for communication can be optimized, and stabilization during the communication can be achieved.

(3-2) Configuration of Shoe Sole Transmitter

Figure 8:
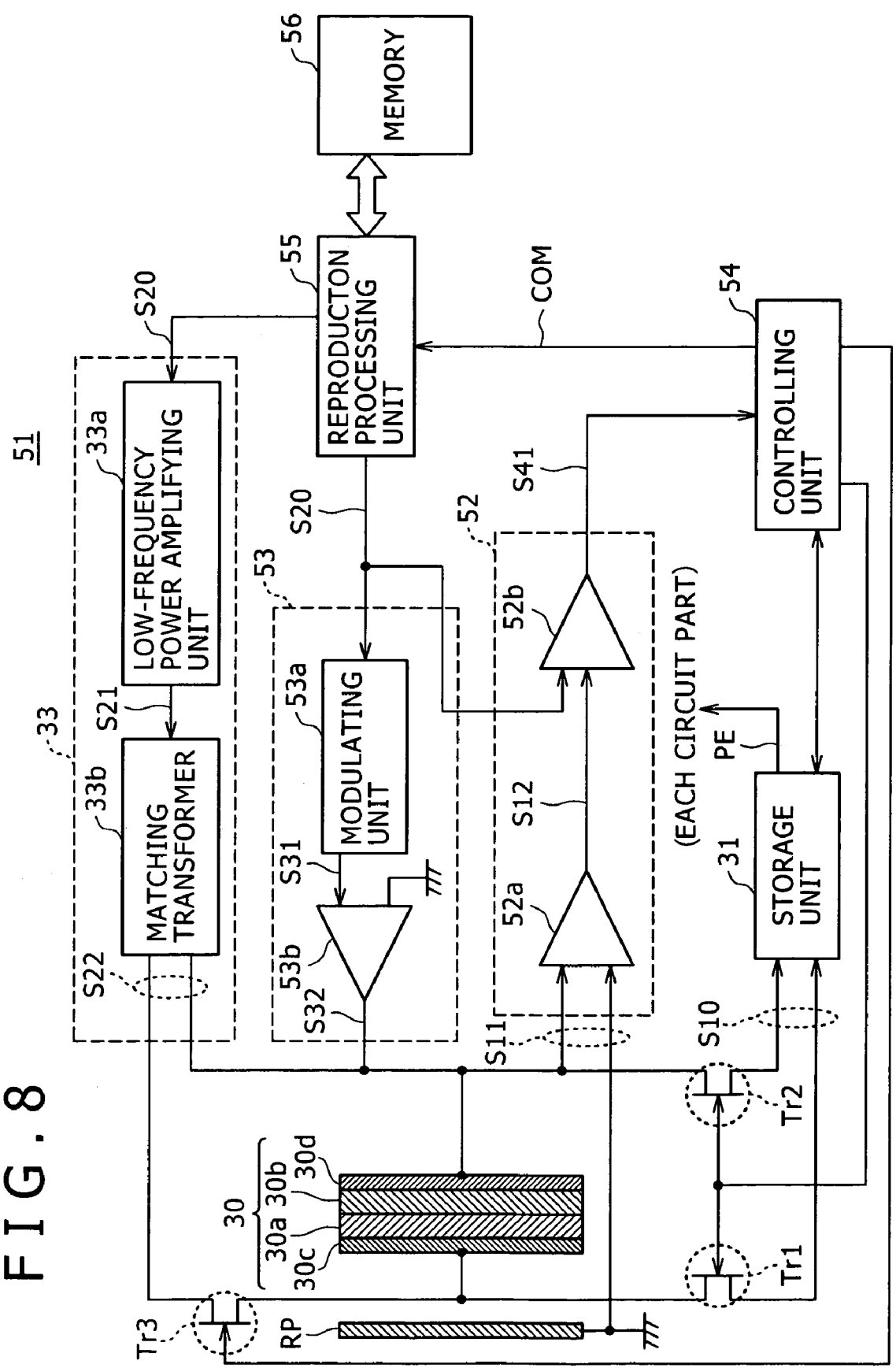
FIG. 8 is a block diagram showing a configuration of a shoe sole transmitter.

The configuration of the shoe sole transmitter 51 will next be described. As shown in FIG. 8 in which parts corresponding to those of FIG. 6 are identified by the same reference numerals, the shoe sole transmitter 51 includes a bimorph 30, a storage unit 31, a foot movement detecting unit 52, a transmitting unit 53, a speaker driving unit 33, a controlling unit 54, a reproduction processing unit 55, and a memory 56 electrically removable from the reproduction processing unit 55.

As in the first embodiment, switching transistors Tr1 and Tr2 are provided to transmission lines between parallel plate electrodes 30c and 30d in the bimorph 30 and the storage unit 31. A switching transistor Tr3 is provided to a transmission line between one parallel plate electrode 30c and the speaker driving unit 33.

The shoe sole transmitter 51 operates in a storage mode when the switching transistors Tr1 and Tr2 are on and the switching transistor Tr3 is off. On the other hand, the shoe sole transmitter 51 operates in an acoustic output mode when the switching transistors Tr1 and Tr2 are off and the switching transistor Tr3 is on.

(3-2-1) Storage Mode

In the storage mode, as in the first embodiment, the storage unit 31 stores electric energy in a capacitor (not shown) on the basis of an alternating-current signal S10 supplied from the bimorph 30. The storage unit 31 supplies the stored electric energy as driving energy PE to the foot movement detecting unit 52, the transmitting unit 53, the speaker driving unit 33, the controlling unit 54, the reproduction processing unit 55, and the memory 56.

(3-2-2) Acoustic Output Mode

In the acoustic output mode, the reproduction processing unit 55 performs various processing corresponding to a normal reproduction, a fast forward reproduction, a fast reverse reproduction, muting, a stop (including processing cancellation), or a pause according to the content of a command COM supplied from the controlling unit 54, and transmits an acoustic signal S20 read from the memory 56 as a result of the reproduction processing to each of the speaker driving unit 33 and the transmitting unit 53 as occasion demands.

As in the first embodiment, the speaker driving unit 33 generates a low-frequency acoustic signal S21 by amplifying a low-frequency component of the acoustic signal S20 to a predetermined level, raises the voltage of the low-frequency acoustic signal S21, and outputs a resulting low-frequency acoustic signal S22 to the parallel plate electrodes 30c and 30d of the bimorph 30. The speaker driving unit 33 thereby applies a vibrating wave based on the low-frequency acoustic signal S22 to the sole of the living body.

The transmitting unit 53 modulates a carrier selected as a low frequency satisfying Equation (8) on the basis of the acoustic signal S20 supplied from the reproduction processing unit 55, and amplifies a modulated signal S31 obtained as a result of the modulation to a predetermined signal level. Then the transmitting unit 53 outputs a modulated signal S32 obtained as a result of the amplification to one parallel plate electrode 30d of the bimorph 30. Thereby a quasi-electrostatic field of higher strength than the strengths of a radiation field and an induction field is applied to the living body disposed in the vicinity of the parallel plate electrode 30d.

A dielectric polarization occurs in the living body to which the quasi-electrostatic field is applied, the quasi-electrostatic field propagates around the surface of the living body, and an equipotential surface is formed. The headphone receiver 3 detects a potential change of the quasi-electrostatic field as a received signal, and applies an acoustic vibrating wave based on the acoustic signal S20 from a speaker to an ear on the basis of the received signal.

Thus, the shoe sole transmitter 51 enables sound based on acoustic data stored in the memory 56 within the shoe sole transmitter 51 to be felt through auditory sensation and simultaneously felt through bodily sensation.

(3-2-3) Mode Changing Process

The controlling unit 54 in the shoe sole transmitter 51 has a computer configuration including a CPU for controlling the whole of the shoe sole transmitter 51, a ROM for storing various programs, and a RAM as a work memory for the CPU.

As in the first embodiment, on the basis of a program stored in the ROM, when the level of the electric energy stored in the capacitor (not shown) in the storage unit 31 exceeds an upper limit threshold value, the controlling unit 54 performs control so as to turn off the switching transistors Tr1 and Tr2 and turn on the switching transistor Tr3, so that the shoe sole transmitter 51 is operated in the acoustic output mode as operation mode.

On the other hand, when the energy level falls below a lower limit threshold value, the controlling unit 54 performs control so as to turn on the switching transistors Tr1 and Tr2 and turn off the switching transistor Tr3, so that the shoe sole transmitter 51 is operated in the storage mode as operation mode.

(3-2-4) Reproduction Control Process

In addition to such a configuration, a potential change corresponding to a movement of the living body is input from the foot movement detecting unit 52 to the controlling unit 54 on the basis of the potential change of the quasi-electrostatic field formed around the surface of the living body. Specifically, the foot movement detecting unit 52 inputs an alternating potential change as a received signal S11 occurring between a receiving electrode RP and the parallel plate electrode 30d of the bimorph 30 to a signal amplifying unit 52a. The signal amplifying unit 52a amplifies the received signal S11 to a predetermined signal level, and transmits a resulting received signal S12 to a differential amplifier 52b.

The differential amplifier 52b is supplied with the acoustic signal S20 from the reproduction processing unit 55. The differential amplifier 52b transmits a differential signal S41 between the acoustic signal S20 and the received signal S12 to the controlling unit 54.

The received signal S12 is obtained as a result of synthesis of the quasi-electrostatic field formed on the surface of the living body according to the acoustic signal S20 and the quasi-electrostatic field formed on the living body according to the movement of the living body. Thus, the differential signal S41 between the acoustic signal S20 and the received signal S12 is extracted as a signal corresponding to potential change in an ultralow frequency band (1 [MHz] and lower) in the quasi-electrostatic field formed according to the movement of the living body.

Figure 9A:
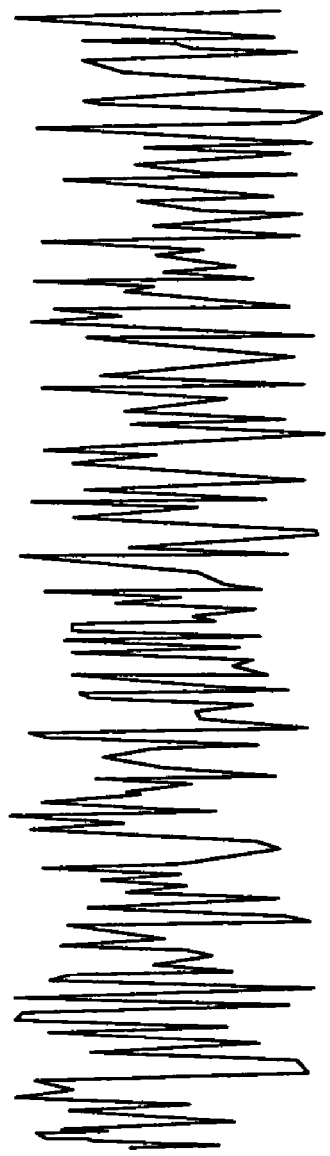
FIGS. 9A, 9B, and 9C are schematic diagrams of assistance in explaining extraction of a stepping signal.
Figure 9B:
Figure 9C:
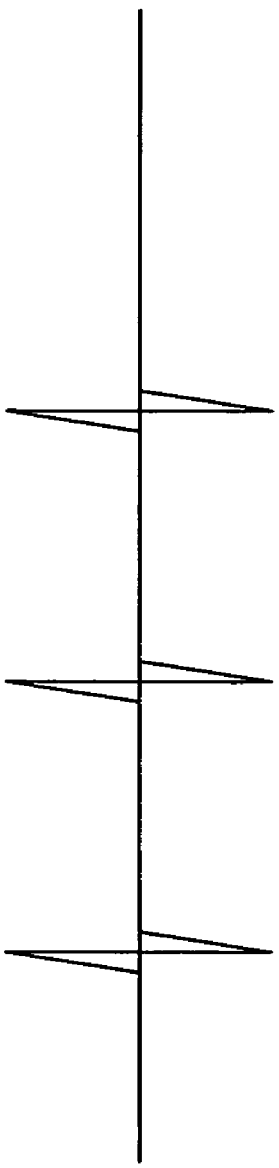

Hence, when the living body performs stepping movement, as shown in FIGS. 9A, 9B, and 9C, for example, the differential signal S41 (FIG. 9C) in the form of a pulse for each stepping unit movement (movement from raising of a foot to setting down of the foot) is input to the controlling unit 54 as output from the differential amplifier 52b which output is based on the acoustic signal S20 (FIG. 9A) and the received signal S12 (FIG. 9B).

Figure 10:
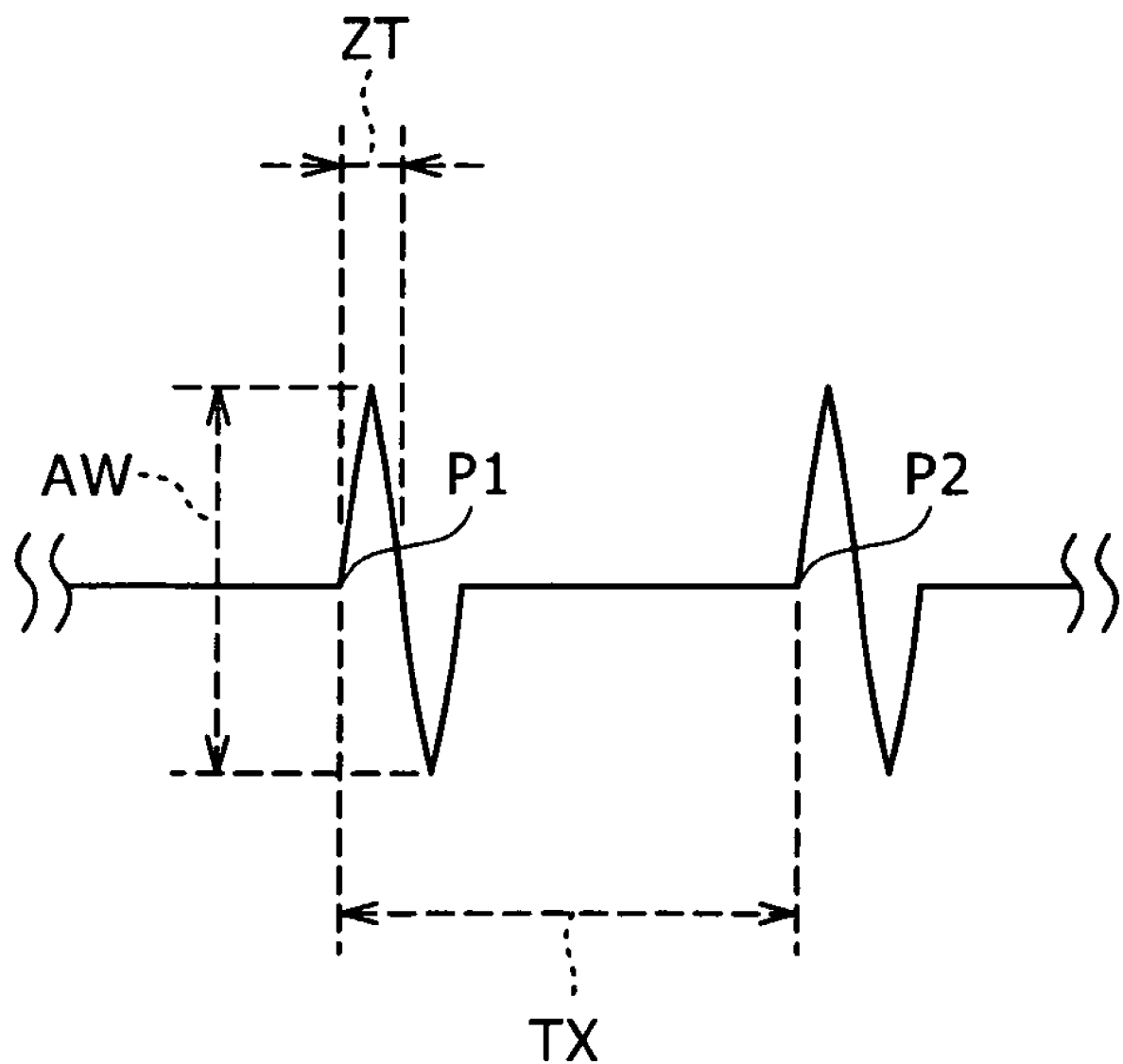
FIG. 10 is a schematic diagram of assistance in explaining stepping movement determining parameters.

As shown in FIG. 10, the controlling unit 54 sets an amplitude width AW of the differential signal S41 and a pulse width ZT of the differential signal S41 as indexes for detecting a stepping unit movement, and sets an upper limit threshold value and a lower limit threshold value for the amplitude width AW and the pulse width ZT.

There are various foot movements other than the stepping movement. In a case of for example jiggling a knee as a typical foot movement, the amplitude width AW is small and the pulse width ZT is shortened as compared with the stepping movement. In a case of walking or ascending or descending steps, the pulse width ZT may be equal to that of the stepping movement, while the amplitude width AW is increased as compared with the stepping movement. Incidentally, the amplitude width AW and the pulse width ZT of movements of the living body other than the foot movements are totally different from those of the stepping movement.

Thus, the controlling unit 54 can accurately detect the stepping unit movement from the various foot movements of the feet as compared with a case where one of the amplitude width AW and the pulse width ZT of the differential signal S41 is set as an index.

In addition, the controlling unit 54 sets a period TX from a rising time point P1 of the differential signal S41 to a next rising time point P2 of the differential signal S41 (this period TX will hereinafter be referred to as a stepping unit movement interval) as an index for detecting stepping unit movements as elements of stepping rhythm, and sets a value corresponding to an interval of a stepping unit movement to be set as a reference.

Figure 11:
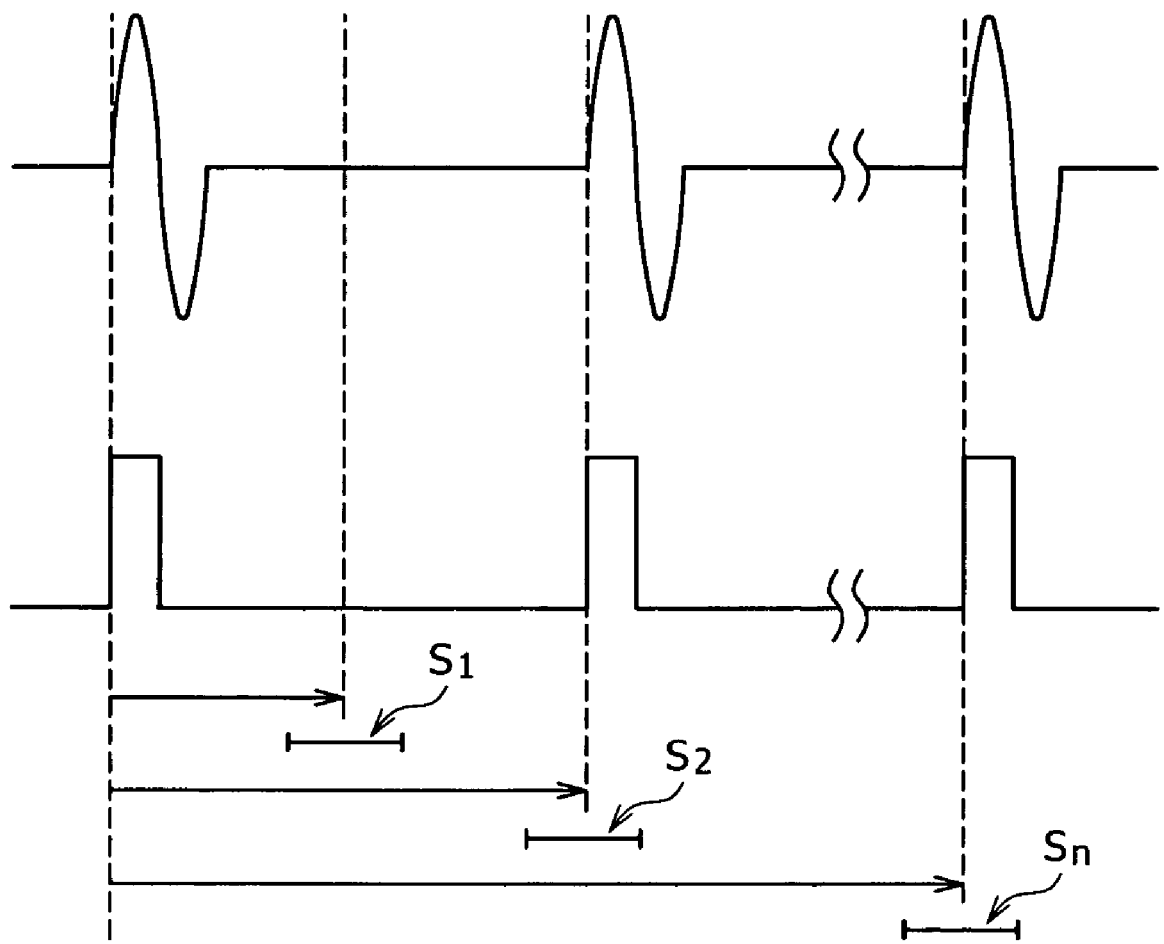
FIG. 11 is a schematic diagram of assistance in explaining generation of stepping pulses.

For example, when the interval of a stepping unit movement as a reference is set at two seconds, as shown in FIG. 11, the controlling unit 54 measures time with a rising time point of a first stepping unit movement as a trigger. Setting, as detection periods, a period $S_1$ including periods before and after the passage of 0.2 seconds from the rising time point, a period $S_2$ including periods before and after the passage of 0.4 seconds, . . . , and a period $S_n$ including periods before and after the passage of 0.2×n seconds, when a stepping unit movement is detected within the detection periods $S_1$ to $S_n$, a stepping pulse is made to rise.

In the present embodiment, as shown in FIG. 12, the controlling unit 54 retains correspondences between stepping pulses (that is, stepping rhythms) and command codes as a database.

The controlling unit 54 detects stepping pulses as described above with reference to FIG. 10 and FIG. 11 on the basis of the database and the amplitude width AW, the pulse width ZT, and the stepping unit movement interval TX of the differential signal S41. The controlling unit 54 generates a code corresponding to the stepping pulses as a command COM, and then transmits the command COM to the reproduction processing unit 55.

As a result, the reproduction processing unit 55 performs processing corresponding to a normal reproduction, a fast forward reproduction, a fast reverse reproduction, muting, a stop (including processing cancellation), or a pause according to the code of the command COM.

Thus, the controlling unit 54 detects a stepping rhythm from potential changes in stepping movement among the potential changes of the quasi-electrostatic field formed around the surface of the living body, and is able to control the processing of the reproduction processing unit 55 according to a result of the detection.

Incidentally, when the controlling unit 54 generates a code for stopping reproduction, the controlling unit 54 determines whether the level of the electric energy stored in the capacitor (not shown) in the storage unit 31 is lower than the upper limit threshold value. When the level of the electric energy is lower than the upper limit threshold value, the electric energy stored in the capacitor (not shown) is consumed, and there is room for storing electricity.

In this case, the controlling unit 54 effects a transition from the audio output mode to the storage mode even when the level of the electric energy stored in the capacitor exceeds the lower limit threshold value. Thereby the shoe sole transmitter 51 can reduce situations in which the level of the electric energy stored in the capacitor is around the lower limit threshold value as compared with a case where the transition to the storage mode is not effected. As a result, the possibility of the electric energy running out in the middle of reproduction can be reduced.

When the controlling unit 54 in the storage mode recognizes stepping pulses corresponding to a reproduction code, the controlling unit 54 determines whether the level of the electric energy stored in the capacitor (not shown) in the storage unit 31 is the lower limit threshold value or higher. When the level of the electric energy stored in the capacitor is the lower limit threshold value or higher, there is room to use the electric energy stored in the capacitor as driving energy.

In this case, the controlling unit 54 effects a transition from the storage mode to the audio output mode even when the level of the electric energy stored in the capacitor is not the upper limit threshold value or higher. Thereby the shoe sole transmitter 51 can reduce situations in which reproduction is not performed even when a certain amount of electric energy is stored in the capacitor, as compared with a case where the transition to the audio output mode is not effected. As a result, processing corresponding to a stepping movement of the living body (user) can be performed more faithfully.

Thus, on the basis of potential change in stepping movement, the controlling unit 54 can not only control the processing of the reproduction processing unit 55 but also control switching to the audio output mode or the storage mode.

(3-3) Operation and Effect of Present Embodiment

With the above constitution, the shoe sole transmitter 51 in the communication system 50 detects stepping movements of the living body on the basis of potential changes of the quasi-electrostatic field formed on the living body according to the movements of the living body (FIG. 10 and FIG. 11), and performs processes each associated with a combination of the number of stepping movements detected and timing of the detected stepping movements (FIG. 12).

Thus, in addition to producing the same effects as the effects of the first embodiment described above, the shoe sole transmitter 51 makes it possible to avoid providing an operating unit or a remote control for having processing on audio data performed to the shoe sole transmitter 51 itself or an electronic device associated with the shoe sole transmitter 51, and enables operation contents to be grasped more intuitively because stepping movements are more familiar than operations of the operating unit.

With the above configuration, the operating unit for having processing on audio data performed can be omitted, so that a more miniaturized communication device than in the first embodiment can be realized.

(4) Third Embodiment (4-1) General Configuration of Communication System

Figure 13:
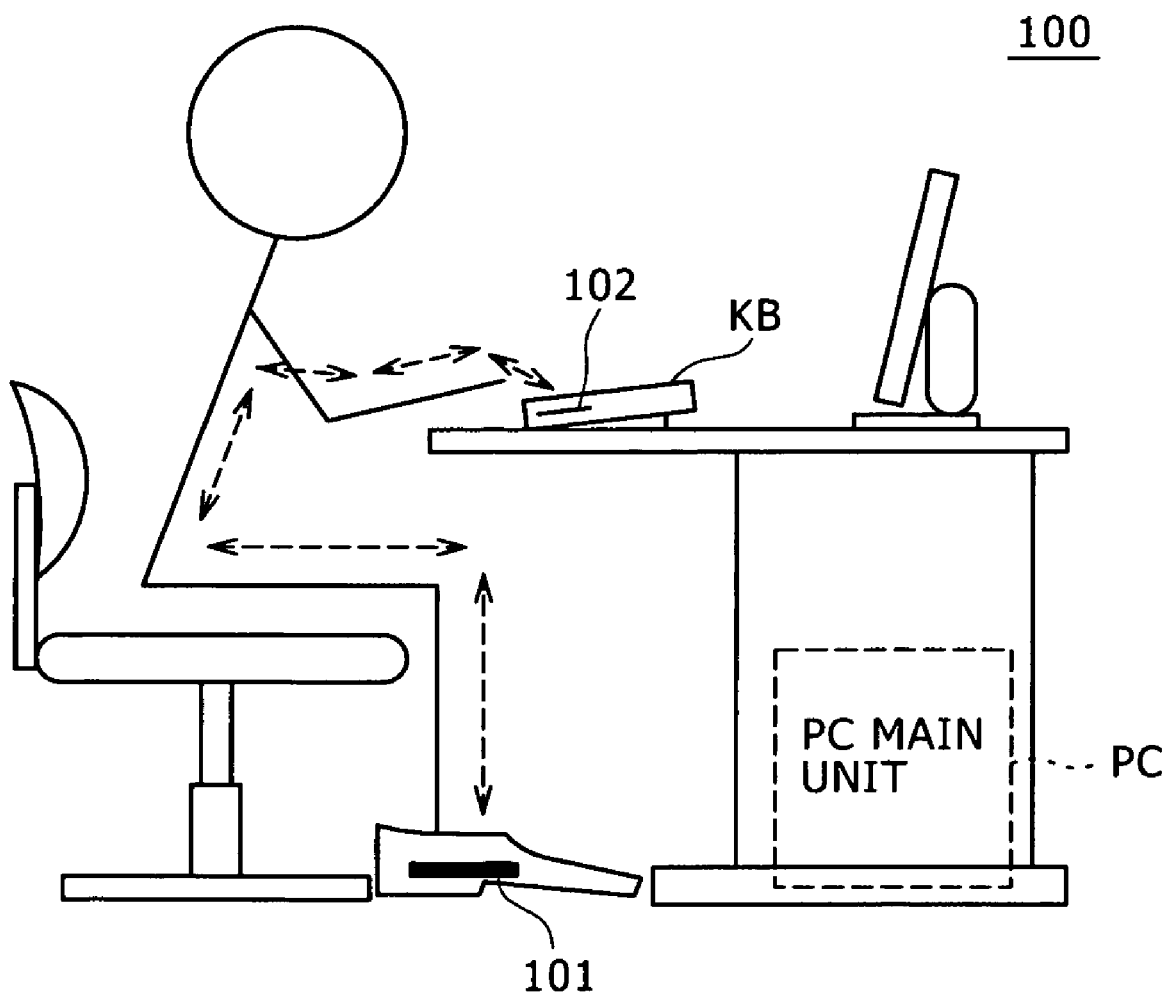
FIG. 13 is a schematic diagram showing a general configuration of a communication system according to a third embodiment.

FIG. 13 shows a general configuration of a communication system 100 according to a third embodiment. The communication system 100 includes: a first communication device (hereinafter referred to as a shoe sole communication terminal) 101 provided to the sole of one of a pair of shoes worn on the feet of a living body; and a second communication device (hereinafter referred to as a keyboard communication terminal) 102 included in a keyboard KB. Incidentally, the keyboard KB is connected to a personal computer PC by wire or by radio.

In a storage mode, the shoe sole communication terminal 101 converts a current generated in a bimorph (not shown) by the movement of the living body, which movement is mainly the walking of the living body, into electric energy, and stores the converted electric energy.

In a communication mode, on the other hand, the shoe sole communication terminal 101 modulates a carrier on the basis of predetermined communication request data, using the stored electric energy as driving energy, amplifies a resulting modulated signal to a predetermined signal level, and outputs the amplified modulated signal to the electrode of the bimorph.

As in the first embodiment, for the carrier, 10 [MHz], for example, is selected as a low frequency satisfying Equation (8) in consideration of a distance between the shoe sole communication terminal 101 and the keyboard communication terminal 102, the relative dielectric constants of air and the living body, and the like.

Thus, a quasi-electrostatic field of higher strength than the strengths of a radiation field and an induction field is applied to the living body disposed in the vicinity of the electrode of the bimorph. A dielectric polarization occurs in the living body to which the quasi-electrostatic field is applied, the quasi-electrostatic field propagates around the surface of the living body, and an equipotential surface is formed.

Thus, the shoe sole communication terminal 101 stores the electric energy obtained by the bimorph as driving energy, and transmits a communication request signal from the electrode of the bimorph.

When the living body approaches the keyboard KB, the keyboard communication terminal 102 detects, as a received signal, potential changes in the quasi-electrostatic field formed around the surface of the living body, amplifies the received signal, and then demodulates the received signal. The keyboard communication terminal 102 thereby obtains the communication request data from the shoe sole communication terminal 101.

At this time, the keyboard communication terminal 102 generates response data in response to the communication request data, modulates a predetermined carrier on the basis of the response data, amplifies a resulting modulated signal to a predetermined signal level, and then outputs the amplified modulated signal to a communication electrode.

As in the shoe sole communication terminal 101, 10 [MHz], for example, is selected for the carrier. Thus, a quasi-electrostatic field of higher strength than the, strengths of a radiation field and an induction field is applied to the living body disposed in the vicinity of the communication terminal, and the quasi-electrostatic field is formed around the surface of the living body.

The quasi-electrostatic field formed around the surface of the living body is detected as a received signal by the shoe sole communication terminal 101 via the electrode of the bimorph in the shoe sole communication terminal 101. The shoe sole communication terminal 101 amplifies the received signal, and then demodulates the received signal. The shoe sole communication terminal 101 thereby obtains the response data from the keyboard communication terminal 102.

In this state, the shoe sole communication terminal 101 and the keyboard communication terminal 102 mutually transmit and receive various kinds of data with the quasi-electrostatic field as a communication medium, and thereby make the personal computer PC recognize a memory included within the shoe sole communication terminal 101 as an external storage device. Thereafter, data stored in the memory can be supplied to the personal computer PC, or data supplied from the personal computer PC can be stored in the memory.

Thus, with the quasi-electrostatic field as a communication medium and with the living body disposed in the quasi-electrostatic field as a medium body, when the living body approaches the keyboard KB, the communication system 100 can make the personal computer PC connected to the keyboard KB automatically recognize the memory included within the shoe sole communication terminal 101 as an external storage device.

Incidentally, broken lines shown in FIG. 13 schematically represent a flow of data being communicated between the keyboard communication terminal 102 and the shoe sole communication terminal 101.

Incidentally, as in the communication system 1 according to the first embodiment, in the communication system 100, parallel plate electrodes are employed as the communication electrode of the keyboard communication terminal 102 and the electrodes of the bimorph (not shown) in the shoe sole communication terminal 101, and with the electrode shape, the electrode area, and the inter-electrode distance of the parallel plate electrodes as parameters, the parallel plate electrodes are designed so as to satisfy a relation such that when a signal of a certain frequency is given, an induction field component of an electric field at a position near a transmitting side is smaller than the noise floor and larger than voltage noise in the signal amplifying unit of a receiving side detecting the electric field.

Thus, in the communication system 100, as described above in the first embodiment, a signal component to be received can be surely received. As a result, energy necessary for communication can be optimized, and stabilization during the communication can be achieved.

(4-2) Configuration of Shoe Sole Communication Terminal

Figure 14:
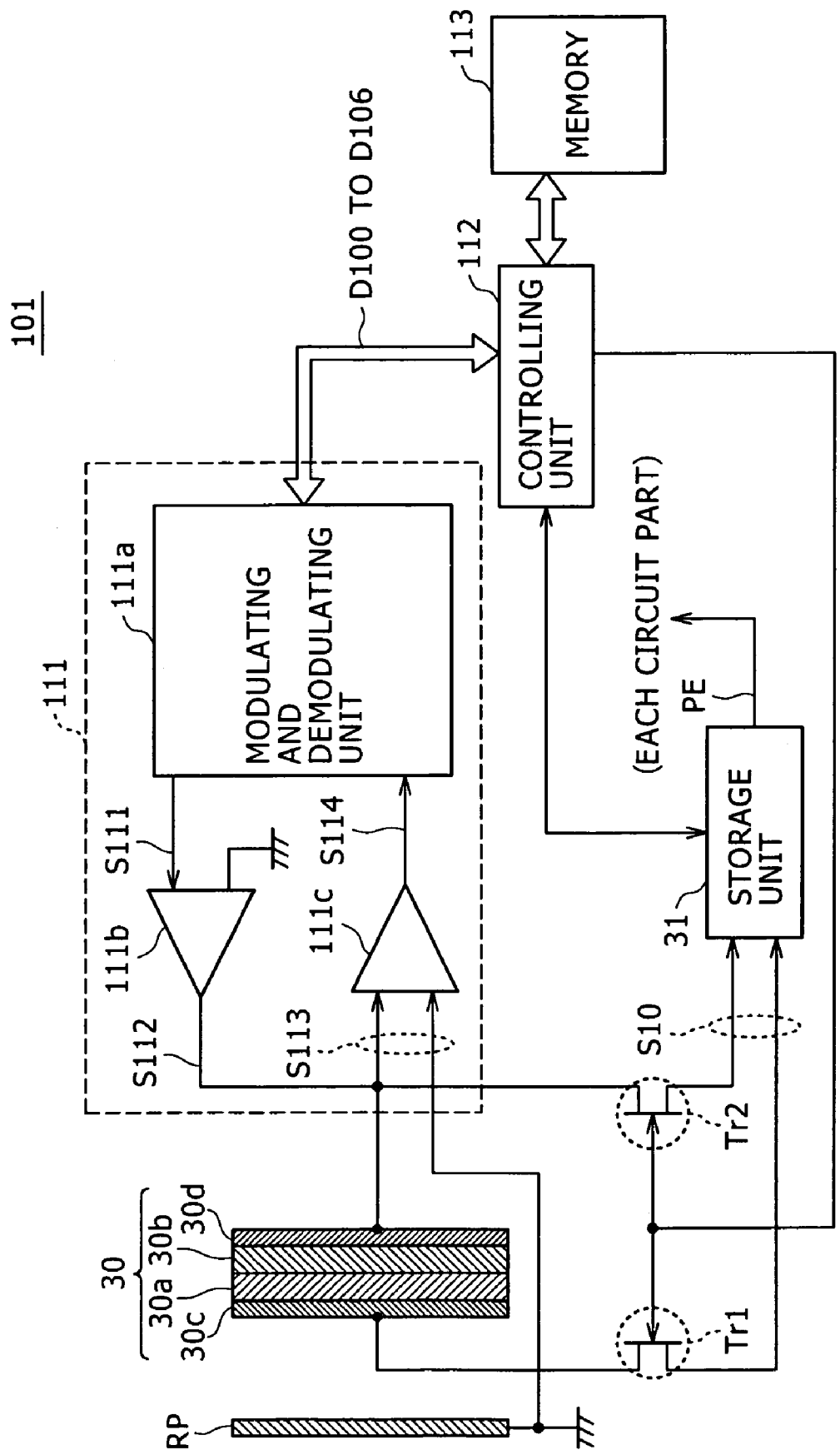
FIG. 14 is a block diagram showing a configuration of a shoe sole communication terminal.

The configuration of the shoe sole communication terminal 101 will next be described. As shown in FIG. 14, in which parts corresponding to those of FIG. 6 are identified by the same reference numerals, the shoe sole communication terminal 101 includes a bimorph 30, a storage unit 31, a communication processing unit 111, a controlling unit 112, and a memory 113.

Switching transistors Tr1 and Tr2 are provided to transmission lines between parallel plate electrodes 30c and 30d in the bimorph 30 and the storage unit 31. The shoe sole communication terminal 101 operates in a storage mode when the switching transistors Tr1 and Tr2 are on. On the other hand, the shoe sole communication terminal 101 operates in a communication mode when the switching transistors Tr1 and Tr2 are off.

(4-2-1) Storage Mode

In the storage mode, as in the first embodiment, the storage unit 31 stores electric energy in a capacitor (not shown) on the basis of an alternating-current signal S10 supplied from the bimorph 30. The storage unit 31 supplies the stored electric energy as driving energy PE to the communication processing unit 111, the controlling unit 112, and the memory 113.

Thus, the shoe sole communication terminal 101 can store the electric energy obtained by the bimorph 30 as driving energy.

Incidentally, the controlling unit 112 monitors the electric energy stored in the capacitor (not shown) in the storage unit 31. When the level of the electric energy exceeds an upper limit threshold value, the controlling unit 112 turns off the switching transistors Tr1 and Tr2 to go into the communication mode. On the other hand, when the level of the electric energy falls below a lower limit threshold value, the controlling unit 112 turns on the switching transistors Tr1 and Tr2 to go into the storage mode.

(4-2-2) Communication Mode

In the communication mode, the communication processing unit 111 modulates a predetermined carrier in a modulating and demodulating unit 111a on the basis of communication request data D100 supplied from the controlling unit 112, and amplifies the modulated signal S111 to a predetermined signal level in a signal amplifying unit 111b.

Then the communication processing unit 111 outputs a modulated signal S112 obtained as a result of the amplification to one parallel plate electrode 30d of the bimorph 30. Thereby a quasi-electrostatic field of higher strength than the strengths of a radiation field and an induction field is applied to the living body disposed in the vicinity of the parallel plate electrode 30d. A dielectric polarization occurs in the living body to which the quasi-electrostatic field is applied, the quasi-electrostatic field propagates around the surface of the living body, and an equipotential surface is formed.

Thus, the shoe sole communication terminal 101 transmits a communication request signal from the electrode 30d of the bimorph 30.

Incidentally, since the frequency bands of the alternating-current signal S10 and the modulated signal S112 differ greatly from each other, the modulated signal S112 output to the bimorph 30 does not affect the electric energy stored in the capacitor on the basis of the alternating-current signal S10.

When the living body approaches the keyboard KB, the shoe sole communication terminal 101 detects, as a received signal S113, potential change of the quasi-electrostatic field formed around the surface of the living body by a receiving electrode RP and the parallel plate electrode 30d of the bimorph 30, and inputs the received signal S113 to the communication processing unit 111. The communication processing unit 111 amplifies the received signal S113 in a signal amplifying unit 111c, demodulates a resulting received signal S114 in the modulating and demodulating unit 111a, and transmits a result of the demodulation as data (hereinafter referred to as demodulation result data) D101 to the controlling unit 112.

The controlling unit 112 has a computer configuration including a CPU for controlling the whole of the shoe sole communication terminal 101, a ROM for storing various programs, and a RAM as a work memory for the CPU.

When the controlling unit 112 recognizes that contents of the demodulation result data D101 supplied from the communication processing unit 111 indicate a response to the communication request from the shoe sole communication terminal 101, the controlling unit 112 determines whether the level of electric energy stored in the capacitor (not shown) in the storage unit 31 is the lower limit threshold value or higher. When the level of the electric energy stored in the capacitor is the lower limit threshold value or higher, there is room to use the electric energy stored in the capacitor as driving energy.

Thus, in this case, the controlling unit 112 does not set the switching transistors Tr1 and Tr2 in an on state (storage mode) and maintains the switching transistors Tr1 and Tr2 in an off state (communication mode) even when the level of the electric energy stored in the capacitor is lower than the upper limit threshold value.

Thus, when the personal computer PC is used, that is, in a communicating state, the shoe sole communication terminal 101 can electrically disconnect the electrode 30d of the bimorph 30 from the storage unit 31 and set the electrode 30d of the bimorph 30 in a floating state with respect to a ground.

Thereafter, the controlling unit 112 generates an identifier unique to the shoe sole communication terminal 101 as data (hereinafter referred to as comparison identifier data) D102 to be compared with an identifier (hereinafter referred to as an authentication identifier) registered for authentication in the keyboard communication terminal 102. The controlling unit 112 controls the communication processing unit 111 to transmit the comparison identifier data D102.

The communication processing unit 111 encrypts and modulates the comparison identifier data D102 in the modulating and demodulating unit 111a, and then outputs the comparison identifier data D102 to the parallel plate electrode 30d of the bimorph via the signal amplifying unit 111b. As a result, with a quasi-electrostatic field transmitted from the parallel plate electrode 30d as a communication medium, the comparison identifier data D102 is transmitted to the keyboard communication terminal 102.

The keyboard communication terminal 102 performs decryption, demodulation and the like on the basis of potential change of the quasi-electrostatic field, compares the comparison identifier data D102 obtained as a result with the authentication identifier, and returns a result of the comparison to the shoe sole communication terminal 101 with the quasi-electrostatic field as communication medium.

The controlling unit 112 waits for such a comparison result until a predetermined period from a time point of the transmission of the comparison identifier data D102 has passed. Then, when the controlling unit 112 receives, as the comparison result, data D103 indicating that the shoe sole communication terminal 101 is an authorized shoe sole communication terminal via the bimorph 30 and the communication processing unit 111 in this order, the controlling unit 112 generates information (hereinafter referred to as memory information) D104 on the memory 113 such for example as specifications. The controlling unit 112 controls the communication processing unit 111 to transmit the memory information D104 to the keyboard communication terminal 102.

In this case, the memory information D104 is transmitted to the keyboard communication terminal 102 in the same manner as the comparison identifier data D102. On the basis of the memory information D104, the keyboard communication terminal 102 recognizes the memory 113 in the shoe sole communication terminal 101 as an external storage device for the personal computer PC.

Incidentally, when the controlling unit 112 does not receive the data D103 indicating that the shoe sole communication terminal 101 is an authorized shoe sole communication terminal before the predetermined period from the time point of the transmission of the comparison identifier data D102 has passed, or the result of the comparison in the keyboard communication terminal 102 indicates that the shoe sole communication terminal 101 is not an authorized shoe sole communication terminal, the controlling unit 112 controls the communication processing unit 111 to retransmit the comparison identifier data D102 to the keyboard communication terminal 102.

Thus, when the living body approaches the keyboard KB, the controlling unit 112 can make the personal computer PC connected to the keyboard KB automatically recognize the memory included within the shoe sole communication terminal 101 as an external storage device.

In this state, with the quasi-electrostatic field as communication medium and with the living body disposed in the quasi-electrostatic field as a medium body, when the controlling unit 112 receives communication data D105 from the keyboard communication terminal 102 via the bimorph 30 and the communication processing unit 111 in this order, the controlling unit 112 controls the memory 113 according to the data D105.

Specifically, when the communication data D105 is an instruction to write data supplied from the personal computer PC (FIG. 13), the controlling unit 112 writes the communication data D105 to the memory 113.

When the communication data D105 is an instruction to read predetermined data stored in the memory 113, the controlling unit 112 reads corresponding data as communication data D106 from the memory 113, and then transmit& the communication data D106 to the communication processing unit 111.

In this case, the communication processing unit 111 modulates a carrier in the modulating and demodulating unit 111a on the basis of the communication data D106, and then outputs the result to the parallel plate electrode 30d of the bimorph via the signal amplifying unit 111b. As a result, with the quasi-electrostatic field transmitted from the parallel plate electrode 30d as communication medium, the communication data D106 is transmitted to the keyboard communication terminal 102.

Thus, the shoe sole communication terminal 101 can use the memory included within the shoe sole communication terminal 101 as an external storage device external to the personal computer PC.

Incidentally, when the controlling unit 112 receives the data D103 indicating that the shoe sole communication terminal 101 is an authorized shoe sole communication terminal, the controlling unit 112 controls the communication processing unit 111 to transmit communication request data D100 to the keyboard communication terminal 102 as occasion demands. Then, the controlling unit 112 determines whether the living body is so distant from the keyboard KB as to be in a non-communication area according to whether there is a response to the communication request data D100 from the keyboard communication terminal 102.

Even when the controlling unit 112 determines that the living body is so distant from the keyboard KB as to be in a non-communication area, the controlling unit 112 maintains the switching transistors Tr1 and Tr2 in an off state (communication mode) unless the level of electric energy stored in the capacitor is lower than the lower limit threshold value.

Thus, even when the personal computer PC is not used, that is, even when the living body (user) is distant from the keyboard KB and is moving, the shoe sole communication terminal 101 is ready to perform communication when the living body (user) thereafter approaches the keyboard KB again, unless the level of the electric energy stored in the capacitor is lower than the lower limit threshold value.

(4-3) Configuration of Keyboard Communication Terminal

Figure 15:
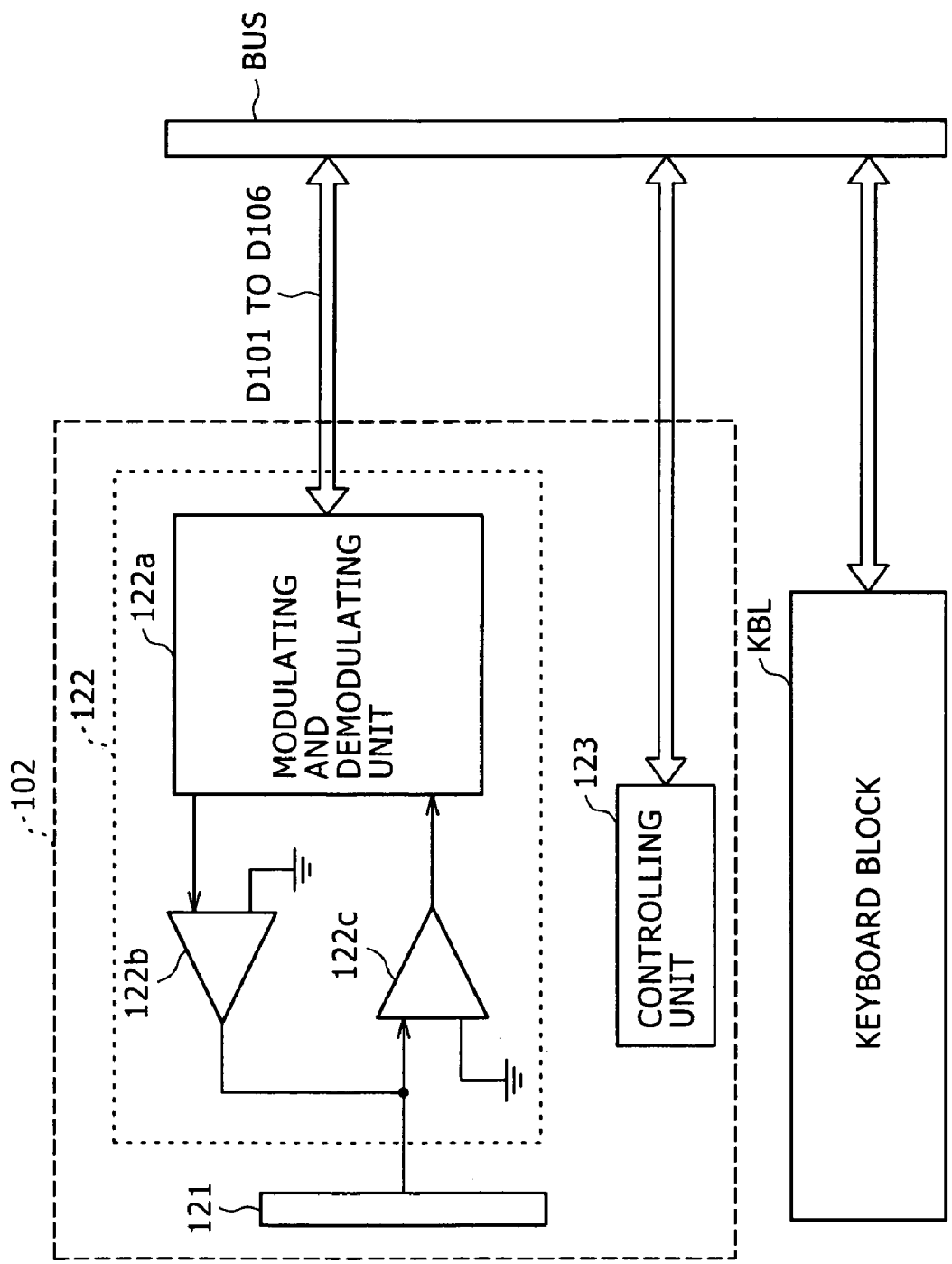
FIG. 15 is a block diagram showing a configuration of a keyboard communication terminal.

The configuration of the keyboard communication terminal 102 will next be described. As shown in FIG. 15, the keyboard communication terminal 102 includes a communication electrode 121, a communication processing unit 122, and a controlling unit 123.

The communication processing unit 122 and the controlling unit 123 are each connected to a USB (Universal Serial Bus) bus BUS, for example, as a communication channel between a circuit block (not shown) for implementing functions of the personal computer PC and a keyboard block KBL for implementing functions of the keyboard KB. The communication processing unit 122 and the controlling unit 123 operate on power supplied from the personal computer PC (FIG. 13) via the USB bus BUS.

The communication processing unit 122 modulates a carrier selected as a low frequency satisfying Equation (8) in a modulating and demodulating unit 122a on the basis of data supplied from the controlling unit 123, amplifies a modulated signal obtained as a result of the modulation in a signal amplifying unit 122b, and then outputs the amplified modulated signal to the communication electrode 121.

As a result, the communication electrode 121 changes in potential according to the modulated signal, and a quasi-electrostatic field is transmitted from the communication electrode 121. When the living body is in the quasi-electrostatic field of predetermined strength which field is generated from the keyboard KB, communication can be performed with the shoe sole communication terminal 101 (FIG. 14) provided to the living body.

In this case, the communication processing unit 122 detects, by the communication electrode 121, potential change of the quasi-electrostatic field formed around the surface of the living body approaching the keyboard KB as a received signal with the shoe sole communication terminal 101 as a transmitting source, amplifies the received signal by a signal amplifying unit 122c, and then demodulates the received signal. The communication processing unit 122 transmits resulting data to the controlling unit 123.

The controlling unit 123 has a computer configuration including a CPU for controlling the whole of the keyboard communication terminal 102, a ROM for storing various programs, and a RAM as a work memory for the CPU.

The controlling unit 123 controls the communication processing unit 122, the keyboard block KBL, and the personal computer PC connected to the USB bus BUS as appropriate on the basis of a program stored in the ROM and the data supplied from the communication processing unit 122 (the data transmitted with the shoe sole communication terminal 101 as a transmitting source).

Specifically, when the data transmitted with the shoe sole communication terminal 101 as a transmitting source is communication request data D100 (FIG. 14 and FIG. 15), this means that the living body has approached the keyboard KB.

In this case, the controlling unit 123 generates response data as a response to the communication request data D100, and transmits the response data to the shoe sole communication terminal 101 via the communication processing unit 122 and the communication electrode 121 in this order.

When the data transmitted with the shoe sole communication terminal 101 as a transmitting source is comparison identifier data D102 (FIG. 14 and FIG. 15), this means that the response data has been successfully transmitted to the shoe sole communication terminal 101.

In this case, the controlling unit 123 compares an authentication identifier registered within in advance and the comparison identifier data D102 with each other, and determines whether the communication terminal as the transmitting source of the comparison identifier data D102 is an authorized shoe sole communication terminal 101 according to a degree of comparison. Then, the controlling unit 123 generates, as a result of the determination, data D103 (FIG. 14) indicating that the communication terminal as the transmitting source of the comparison identifier data D102 is an authorized shoe sole communication terminal or generates data indicating that the communication terminal as the transmitting source of the comparison identifier data D102 is not an authorized shoe sole communication terminal. The controlling unit 123 transmits the data to the shoe sole communication terminal 101 via the communication processing unit 122 and the communication electrode 121 in this order.

When the data transmitted with the shoe sole communication terminal 101 as a transmitting source is memory information D104 (FIG. 14 and FIG. 15), this means that the controlling unit 123 recognizes that the other communication device is the shoe sole communication terminal 101 on the basis of the result of the above-described comparison.

In this case, the controlling unit 123 transmits the memory information D104 to the personal computer PC (FIG. 13), and controls the personal computer PC so that the personal computer PC recognizes the memory 113 (FIG. 14) corresponding to the memory information D104 as an external storage device.

At this time, on the basis of the memory information D104, the personal computer PC displays information indicating that a new external storage device is connected, as well as data contents or the like to be stored in the external storage device, on a monitor (not shown), for example. As a result, the living body (user) near the keyboard KB can issue an instruction to read the memory 113 included in the sole of the shoe of the living body or an instruction to write the memory 113 from an input unit such as the keyboard KB, a mouse (not shown) or the like connected to the personal computer PC.

In this state, data such for example as acoustic data, video data, or program data as data to be written to the memory 113 in the shoe sole communication terminal 101, or the data of an instruction to read predetermined data recorded in the memory 113 is supplied from the personal computer PC to the controlling unit 123.

When the controlling unit 123 receives such data, the controlling unit 123 sets the data as communication data D105 (FIG. 14) to be transmitted to the shoe sole communication terminal 101, and then transmits the communication data D105 to the shoe sole communication terminal 101 via the communication processing unit 122 and the communication electrode 121 in this order.

When the controlling unit 123 receives communication data D106 (FIG. 14) as a response to an instruction to read predetermined data recorded in the memory 113 from the shoe sole communication terminal 101 via the living body, the communication electrode 121, and the communication processing unit 122 in this order, the controlling unit 123 supplies the communication data D106 to the personal computer PC.

Thus, the keyboard communication terminal 102 can use the memory included within the shoe sole communication terminal 101 as an external storage device external to the personal computer PC.

(4-4) Operation and Effects of Present Embodiment

With the above configuration, the shoe sole communication terminal 101 in the communication system 100 stores a potential occurring between the parallel plate electrodes 30c and 30d of the bimorph 30 due to a piezoelectric effect of the piezoelectric substances 30a and 30b as electric energy, and transmits communication request data D100 from the parallel plate electrode 30d with a signal in a frequency band where the strength of a quasi-electrostatic field is dominant as compared with a radiation field and an induction field at a predetermined distance as a carrier.

Thus, the shoe sole communication terminal 101 can use the parallel plate electrodes 30c and 30d of the bimorph 30 as both the electrodes of a driving energy generating source and communication electrodes (transmitting electrodes). As a result, the bimorph 30 can be used as an energy generator and an antenna.

In addition, when the shoe sole communication terminal 101 receives response data in response to the communication request data D100 transmitted with a signal in a frequency band where the strength of a quasi-electrostatic field is dominant as compared with a radiation field and an induction field at a predetermined distance as a carrier via the receiving electrode RP and the parallel plate electrode 30d of the bimorph 30, the shoe sole communication terminal 101 transmits and receives various data to and from the other communication device (keyboard communication terminal 102) to make the memory 113 in the shoe sole communication terminal 101 itself recognized as an external storage device, using the carrier.

Thus, when the other communication device is in the quasi-electrostatic field, the shoe sole communication terminal 101 automatically performs data communication with the other communication device, and the memory 113 in the shoe sole communication terminal 101 is recognized as an external storage device. That is, when the living body approaches the keyboard KB, the shoe sole communication terminal 101 is automatically recognized as an external storage device without a battery being demanded.

Thus, the shoe sole communication terminal 101 makes it possible to avoid providing an operating unit for making the memory 113 recognized as an external storage device to the shoe sole communication terminal 101 itself or an electronic device associated with the shoe sole communication terminal 101, avoid requiring the living body (user) to perform a complex operation, and avoid mislaying the memory 113 as an external storage device.

According to the above constitution, when the other communication device is in the quasi-electrostatic field, the shoe sole communication terminal 101 automatically performs data communication with the other communication device, and makes the memory 113 within the terminal itself recognized as an external storage device, so that a communication device more miniaturized than in the first embodiment and the second embodiment can be realized.

(5) Other Embodiments

In the foregoing first embodiment, description has been made of a case where the switching transistors Tr1 and Tr2 and the switching transistor Tr3 are subjected to switching control according to the level of electric energy stored in the capacitor of the storage unit 31. However, the present invention is not limited to this. Stepping pulses may be detected on the basis of the received signal S12 as in the second embodiment, and inversion control can be performed with a result of the detection also taken into consideration.

Specifically, the controlling unit 34 subjects the received signal S12 to FFT (Fast Fourier Transform) processing, thereby extracts a signal component in an ultralow frequency band (1 [MHz] and lower) occurring on the living body according to movement of the living body, and detects stepping pulses as described above with reference to FIG. 10 and FIG. 11 with the amplitude width AW, the pulse width ZT, and the stepping unit movement interval TX of a result of the extraction as indexes.

In a case of detecting stepping pulses to set a charging mode, the controlling unit 34 turns on the switching transistors Tr1 and Tr2 and turns off the switching transistor Tr3 even when the level of the electric energy stored in the capacitor of the storage unit 31 is not below the lower limit threshold value as long as the level of the electric energy stored in the capacitor of the storage unit 31 is the upper limit threshold value or lower.

On the other hand, in a case of detecting stepping pulses to set an audio output mode, the controlling unit 34 turns off the switching transistors Tr1 and Tr2 and turns on the switching transistor Tr3 even when the level of the electric energy stored in the capacitor of the storage unit 31 does not exceed the upper limit threshold value as long as the level of the electric energy stored in the capacitor of the storage unit 31 is the lower limit threshold value or higher.

Thus, the first embodiment can provide effects of the second embodiment.

In addition, in the foregoing second embodiment, description has been made of a case of generating the differential signal S41 (FIG. 8 and FIG. 9C) between the modulated signal S32 (FIG. 8) and the received signal S12 (FIG. 8) obtained as a result of synthesis of the potential change of the quasi-electrostatic field corresponding to the modulated signal S32 (FIG. 8) and the potential change of the quasi-electrostatic field occurring on the living body according to the movement of the living body, and detecting stepping movement (the number of stepping unit movements and intervals between the stepping unit movements (stepping rhythm)) on the basis of the differential signal S41. However, the present invention is not limited to this. A signal component in an ultralow frequency band (1 [MHz] and lower) occurring on the living body according to the movement of the living body may be extracted by a DCT (Discrete Cosine Transform) or the like, and a stepping movement may be detected on the basis of a result of the extraction.

Further, the foregoing second embodiment uses the correspondences shown in FIG. 12 as correspondences between stepping pulses (that is, stepping rhythm) and command codes. However, the present invention is not limited to this, and various other correspondences may be used. To cite an example, a random reproduction, a forward skip reproduction, a reverse skip reproduction and the like can be employed as code types in addition to the code types shown in FIG. 12.

Further, in the foregoing third embodiment, description has been made of a case where the second communication device 102 (FIG. 13) is included in the keyboard KB. However, the present invention is not limited to this. In place of the keyboard KB, the second communication device 102 may be included in the personal computer PC, in the mouse connected to the personal computer PC, in furniture such as a desk, a chair or the like disposed in the vicinity of the personal computer PC, or in an electronic device wearable by a living body, such as a wrist watch or the like. Alternatively, the second communication device 102 may be applied as a dedicated terminal to be worn by a living body.

In addition, in the foregoing third embodiment, the memory 113 (FIG. 14) within the shoe sole communication terminal 101 is recognized as an external storage device external to the personal computer PC. However, the present invention is not limited to this. The memory 113 may be recognized as an external storage device external to a portable type electronic device such for example as a portable telephone, a PDA (Personal Digital Assistant), or a "HANDYCAM (Registered Trademark of Sony Corporation)." In this case, when the second communication device 102 (FIG. 13) is included in the portable type electronic device or an accessory of the portable type electronic device (for example a cradle in the case of a PDA), the same effects as in the foregoing embodiment can be obtained.

Incidentally, the transmission and reception of data contents for making the personal computer PC recognize the memory 113 as an external storage device and the sequence of the transmission and reception are not limited to the embodiment, and transmission and reception of data contents and the sequence of the transmission and reception that are used commonly may be employed.

Further, in the foregoing third embodiment, description has been made of a case where the shoe sole communication terminal 101 having the configuration shown in FIG. 14 is applied. However, the present invention is not limited to this. The differential amplifier 52b shown in FIG. 8 may be provided in a stage subsequent to the signal amplifying unit 111c, so that the controlling unit 112 detects a walking movement from a differential signal between the received signal S114 and the modulated signal S111, and the charging mode may be set only when the movement is detected.

Then, the shoe sole communication terminal 101 can prevent a situation in which the storage unit 31 is electrically disconnected from the bimorph 30 when electric energy can be stored in the capacitor because the personal computer PC is not used, that is, because the living body (user) is away from the keyboard KB and is moving.

Figure 16:
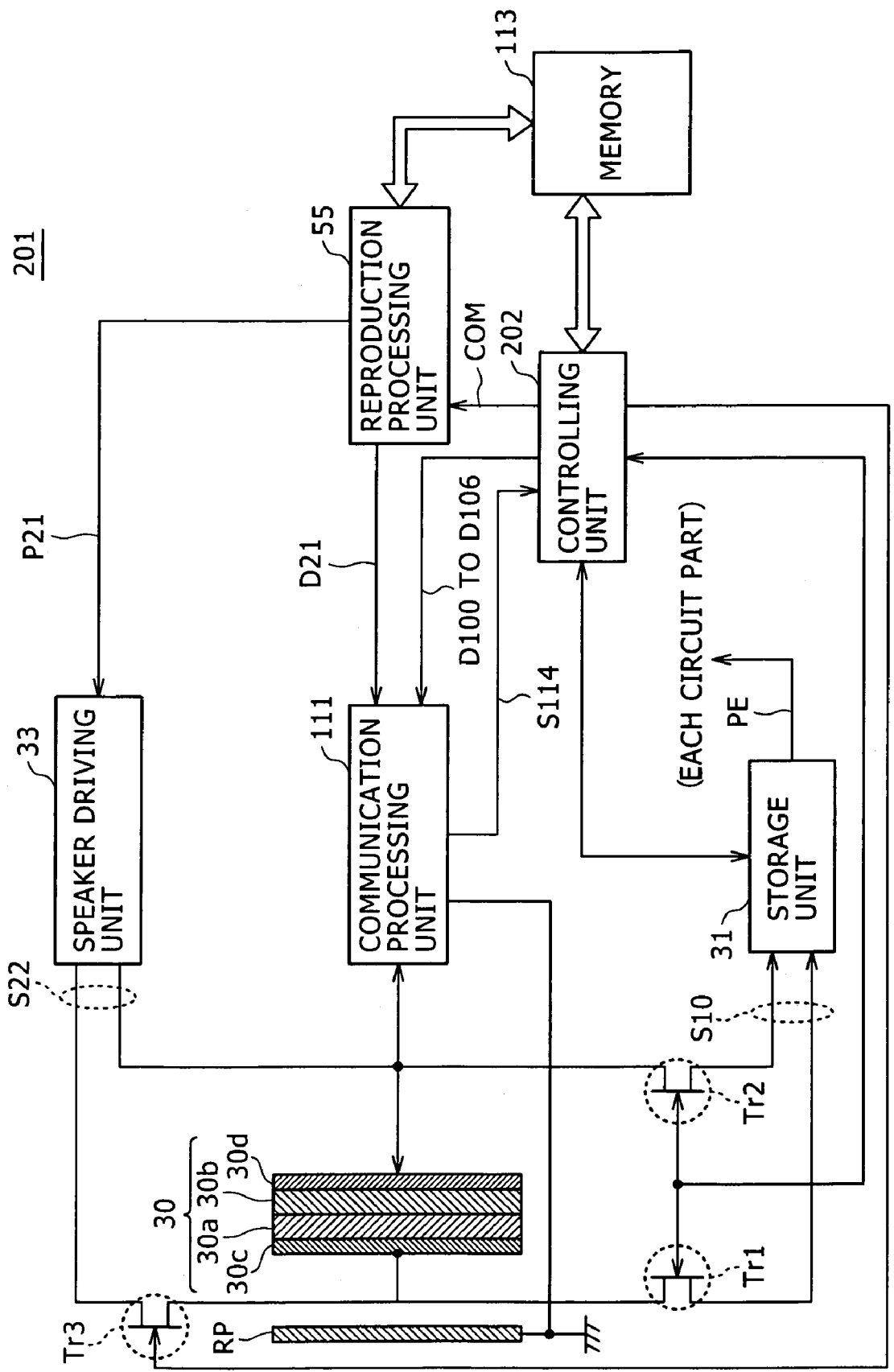
FIG. 16 is a block diagram showing a configuration of a shoe sole communication terminal according to another embodiment.

Further, in the foregoing third embodiment, description has been made of a case where the shoe sole communication terminal 101 having the configuration shown in FIG. 14 is applied. However, the present invention is not limited to this. As shown in FIG. 16, in which parts corresponding to those of FIG. 8 and FIG. 14 are identified by the same reference numerals, a shoe sole communication terminal 201 may be applied in which terminal the reproduction processing unit 55, the speaker driving unit 33, and the switching transistor Tr3 in FIG. 8 are added to the configuration shown in FIG. 14, and a controlling unit 202 is provided in place of the controlling unit 112 shown in FIG. 14.

Specifically, before a living body approaches a keyboard KB, the controlling unit 202 maintains switching transistors Tr1 and Tr2 in an on state and maintains the switching transistor Tr3 in an off state. As a result, a storage unit 31 stores an alternating-current signal S10 obtained from a bimorph 30 as electric energy in a capacitor within the storage unit 31.

In this state, the controlling unit 202 detects stepping pulses in the same manner as the controlling unit 54 in the foregoing second embodiment from a received signal S114 supplied from the parallel plate electrode 30d of the bimorph 30 and a receiving electrode RP to the controlling unit 202 via a communication processing unit 111.

Specifically, the controlling unit 202 subjects the received signal S114 to FFT processing, thereby extracts a signal component in an ultralow frequency band (1 [MHz] and lower) occurring on the living body according to movement of the living body, and detects stepping pulses as described above with reference to FIG. 10 and FIG. 11 with the amplitude width AW, the pulse width ZT, and the stepping unit movement interval TX of a result of the, extraction as indexes.

When the controlling unit 202 detects predetermined stepping pulses, the controlling unit 202 turns off the switching transistors Tr1 and Tr2 and turns on the switching transistor Tr3, and transmits a code corresponding to the detected stepping pulses as a command COM to the reproduction processing unit 55. In this case, predetermined acoustic data stored in the memory 113 is reproduced by the reproduction processing unit 55, generated as a low-frequency acoustic component signal S22 by the speaker driving unit 33, and then output to the parallel plate electrodes 30c and 30d of the bimorph 30. As a result, a vibrating wave corresponding to the low-frequency acoustic signal S22 is applied to the sole of the living body.

When the controlling unit 202 detects demodulation result data D101 representing a response to communication request data D100 from the communication processing unit 111 as the living body approaches the keyboard KB, the controlling unit 202 turns off the switching transistors Tr1 and Tr2 even when the level of electric energy stored in the capacitor (not shown) in the storage unit 31 is not the upper limit threshold value or higher as long as the level of the electric energy stored in the capacitor is the lower limit threshold value or higher.

Then, as with the controlling unit 112, the controlling unit 202 controls the communication processing unit 111 to transmit and receive various information to and from a keyboard communication terminal 102. The controlling unit 202 thereby makes a personal computer PC recognize the memory 113 as an external storage device. In addition, as occasion demands, the controlling unit 202 supplies data stored in the memory 113 to the personal computer PC, or stores data supplied from the personal computer PC in the memory.

Incidentally, in this embodiment, a case where the living body approaches the keyboard KB while acoustic data recorded in the memory 113 is being reproduced is assumed. In this case, the controlling unit 202 gives a higher priority to a process of making the memory 113 recognized as an external storage device and making various data read and written in the memory 113 than to a process of reproducing acoustic data recorded in the memory 113.

In addition to making the personal computer PC recognize the memory 113 (FIG. 14) as an external storage device, such a shoe sole communication terminal 201 enables sound based on the acoustic data stored in the memory 113 to be felt through auditory sensation and simultaneously felt through bodily sensation when the memory 113 is not recognized as the external storage device.

Further, in the foregoing third embodiment, description has been made of a case where an identifier unique to the shoe sole communication terminal 101 is used as comparison identifier data D102 (FIG. 14). However, the present invention is not limited to this. A signal of displacement of an electric field formed on the living body as the living body makes a two-leg movement may be used as an identifier unique to the living body.

When the living body makes a movement of walking on a flat road surface without being particularly conscious of speed (hereinafter referred to simply as walking), displacement of an electric field formed on the living body changes according to differences between a left foot and a right foot, differences between individual living bodies, and differences in walking mode such as a walk path or the like, and thus forms a unique pattern.

However, in a walking process, immediately after the toe of one foot leaves a ground, the whole sole surface of the other foot lands on the ground irrespective of differences in walking mode. Thus, at this time, electric interference between the left foot and the right foot does not occur, and an amplitude peak in a band of 8 [Hz]±2 [Hz] uniquely appears. Therefore, when the amplitude peak is used as an index, it is possible to determine one step from the displacement of the electric field formed on the living body in walking.

In addition, this amplitude peak varies according to the speed of a movement from a state of the whole sole surface of one foot being in contact with a road surface to a state immediately after the toe of the one foot leaves the ground. Therefore one step of two-leg movement can be determined in cases of other than walking. For details of the above contents, see Japanese Patent Application No. 2002-314920 filed by the present applicant.

Specifically, using, as an index, an amplitude peak in a predetermined frequency band appearing immediately after the toe of the other foot leaves the ground while the whole sole surface of one foot is in contact with the ground, among displacements of the electric field (ultralow frequency band (1 [MHz] and lower)) formed on the living body as the living body makes a two-leg movement, from a received signal S114 supplied via the bimorph 30 and the signal amplifying unit 111c in this order, the controlling unit 112 cuts out a waveform from a peak of interest to intermediate positions of peaks preceding and succeeding the peak of interest as a waveform corresponding to one step among waveform parts where peak intervals are equal to each other, and then generates this waveform as an identifier.

Then, authentication is made possible without a need for retaining an identifier unique to the shoe sole communication terminal 101. Therefore the shoe sole communication terminal 101 can be miniaturized as compared with a case where the identifier is retained.

Further, in the foregoing embodiments, description has been made of a case where the bimorph 30 having the structure shown in FIG. 6, FIG. 8, FIG. 14, or FIG. 16 is applied as a piezoelectric element having a structure formed by laminating piezoelectric substances and electrodes. However, the present invention is not limited to this. A monomorph may be applied when the structure thereof is formed by laminating piezoelectric substance and electrodes, a so-called laminated piezoelectric element formed by stacking a large number of piezoelectric substances may be applied, or a member such as a diaphragm, a spring, a ratchet or the like may be further added.

In addition, in the foregoing embodiments, a shoe sole is applied as a position for disposing such a piezoelectric element (that is, the shoe sole receivers 4 and 5 (first embodiment), the shoe sole transmitter 51 (second embodiment), and the shoe sole communication terminal 101 (third embodiment) including the piezoelectric element). However, the present invention is not limited to this. Various parts of the living body that allow the piezoelectric element to vibrate, such for example as an armpit, a leg, or an arm, may be applied. Incidentally, the shoe sole receivers 4 and 5 in the first embodiment and the shoe sole transmitter 51 in the second embodiment may be included in the headphones HP, or may be included in an earphone in place of the headphones HP.

In addition, in the foregoing embodiments, description has been made of a case where the speaker driving unit 33 for driving the piezoelectric element as a speaker by outputting a low-frequency signal component of acoustic data is applied as driving means for driving the piezoelectric element as a speaker by outputting the acoustic data to the electrodes of the piezoelectric element. However, the present invention is not limited to this. For example, a speaker driving unit for driving the piezoelectric element as a speaker by outputting all frequency components of the acoustic signal or a specific wavelength range component in an audible range may be applied.

The present invention is applicable to for example a case where an acoustic signal is communicated as an object of communication, and a case where a memory is included in a thing worn by a living body such as a shoe sole or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
    a piezoelectric element formed by laminating piezoelectric substances and electrodes, the piezoelectric element being disposed below a sole of a living body;
    obtaining means for obtaining acoustic data superimposed on a quasi-electrostatic field formed on the living body from an electrode of the piezoelectric element; and
    driving means for driving the piezoelectric element as a speaker by outputting a low-frequency signal component of the acoustic data to the electrode of the piezoelectric element, causing the piezoelectric element to vibrate according to the low-frequency signal.

2. The communication device as claimed in claim 1, further comprising:

energy storing means for storing electric energy generated by a piezoelectric effect of the piezoelectric element.

3. The communication device as claimed in claim 2, wherein the energy storing means stores electric energy generated by a piezoelectric effect produced by a pressure applied to the piezoelectric element by foot movement of the living body.

4. The communication device as claimed in claim 2, further comprising:
switching means for switching states of electric connection of a signal path between the electrode and the energy storing means and a signal path between the electrode and the driving means.

5. The communication device as claimed in claim 4, wherein the switching means is connected to the electrode of the piezoelectric element, detects a foot movement of the living body from change in the quasi-electrostatic field formed on the living body, and switches the states of electric connection so as to invert the states of electric connection.

6. A communication device comprising:
a piezoelectric element formed by laminating piezoelectric substances and electrodes, the piezoelectric element being disposed below a sole of a living body;
energy storing means for storing electric energy generated by a piezoelectric effect of the piezoelectric element;
storing means for storing acoustic data;
driving means for driving the piezoelectric element as a speaker by outputting a low-frequency signal component of the acoustic data to an electrode of the piezoelectric element, causing the piezoelectric element to vibrate according to the low-frequency signal; and
communicating means for performing data communication, using a quasi-electrostatic field formed on the living body, with an object of communication via the electrode of the piezoelectric element, the quasi-electrostatic field having a frequency where the strength of a quasi-electrostatic field is dominant over electrical fields produced by the living body.

7. The communication device as claimed in claim 6, wherein the energy storing means stores electric energy generated by a piezoelectric effect produced by a pressure applied to the piezoelectric element by foot movement of the living body.

8. The communication device as claimed in claim 6, wherein the communicating means is driven using the electric energy.

9. The communication device as claimed in claim 6, further comprising:
communication controlling means for controlling the communicating means to make one of the object of communication and a device connected to the object of communication recognize the storing means as an external storage device.

10. The communication device as claimed in claim 9, wherein the communication controlling means transmits a unique identifier for comparison with an identifier for authentication retained in one of the object of communication and the device connected to the object of communication before the storing means is recognized as an external storage device.

11. The communication device as claimed in claim 10, wherein the unique identifier is generated by using, as an index, an amplitude peak in a predetermined frequency band appearing immediately after a toe of one foot leaves a ground while a whole sole surface of another foot is in contact with the ground, among displacements of an electric field formed on a living body as the living body makes a two-leg movement.

12. The communication device as claimed in claim 6, further comprising:
reproducing means for reproducing the acoustic data stored in the storing means.

13. The communication device as claimed in claim 12, further comprising controlling means for receiving, from the communicating means, potential changes of the quasi-electrostatic field according to movement of the living body, detecting stepping movements of the living body on a basis of the potential changes, and controlling the reproducing means to perform processes associated with a combination of a number of stepping movements detected and timing of the detected stepping movements.

14. The communication device as claimed in claim 13, wherein the controlling means switches states of electric connection of a signal path between the electrodes and the energy storing means and a signal path between the electrodes and the driving means according to a result of detection of the stepping movements.

15. A method comprising:
obtaining acoustic data superimposed on a quasi-electrostatic field formed on a living body from an electrode of a piezoelectric element, the piezoelectric element being formed by laminating piezoelectric substances and electrodes, and being disposed below a sole of a living body; and
driving the piezoelectric element as a speaker by outputting a low-frequency signal component of the acoustic data to the electrode of the piezoelectric element, causing the piezoelectric element to vibrate according to the low-frequency signal.

16. The method as claimed in claim 15, further comprising:
storing electric energy generated by a piezoelectric effect of the piezoelectric element.

17. The method as claimed in claim 16, wherein the electric energy generated by a piezoelectric effect is produced by a pressure applied to the piezoelectric element by foot movement of the living body.

18. The method as claimed in claim 16, further comprising:
selecting a state of an electrical connection of a signal path between a storage mode and an acoustic output mode by detecting a foot movement of the living body from change in the quasi-electrostatic field formed on the living body, and switching the state of the electric connection so as to invert the state of the electric connection.

* * * * *